United States Patent
Breidenbach

(10) Patent No.: US 8,627,738 B2
(45) Date of Patent: Jan. 14, 2014

(54) LINEAR-CURVILINEAR ACTUATING APPARATUS WITH ROTATING JOINTS

(76) Inventor: Thomas Scott Breidenbach, Maple Grove, MN (US)

( * ) Notice: Subject to any disclaimer, the term of this patent is extended or adjusted under 35 U.S.C. 154(b) by 1310 days.

(21) Appl. No.: 11/837,228

(22) Filed: Aug. 10, 2007

(65) Prior Publication Data

US 2008/0184835 A1    Aug. 7, 2008

Related U.S. Application Data

(63) Continuation-in-part of application No. 11/425,854, filed on Jun. 22, 2006, now Pat. No. 7,380,868.

(60) Provisional application No. 60/694,865, filed on Jun. 29, 2005, provisional application No. 60/705,026, filed on Aug. 2, 2005, provisional application No. 60/705,029, filed on Aug. 3, 2005, provisional application No. 60/822,058, filed on Aug. 10, 2006.

(51) Int. Cl.
     *G05G 1/00* (2008.04)

(52) U.S. Cl.
     USPC .............................................. 74/469; 74/470

(58) Field of Classification Search
     USPC ............ 74/469, 89.2, 89.21, 89.22, 520, 521,
                    74/490.04, 490.05; 248/354.6, 354.7;
                    296/180.1, 180.2, 180.3, 180.4, 180.5;
                    52/111, 121, 632; 211/1.56; 901/15,
                    901/28, 29
     See application file for complete search history.

(56) References Cited

U.S. PATENT DOCUMENTS

| | | | | |
|---|---|---|---|---|
| 227,401 | A | * | 5/1880 | Wood .............................. 182/51 |
| 609,789 | A | | 8/1898 | Capewell |
| 797,077 | A | * | 8/1905 | Shaw ............................ 182/141 |
| 1,352,679 | A | | 9/1920 | Myers |
| 1,390,793 | A | | 9/1921 | Kyle et al. |
| 1,912,138 | A | | 5/1933 | Hoover |
| 2,198,635 | A | | 4/1940 | Rossman |
| 2,237,141 | A | * | 4/1941 | Gale ............................ 160/125 |
| 2,338,533 | A | | 1/1944 | Pash |
| 2,569,354 | A | | 9/1951 | Tracy |
| 2,737,411 | A | | 3/1956 | Potter |
| 2,772,624 | A | | 12/1956 | Carnes |
| 2,780,980 | A | | 2/1957 | Kennedy |
| 2,887,243 | A | | 5/1959 | Murdock, Sr. |
| 3,016,700 | A | | 1/1962 | Howald |
| 3,053,351 | A | * | 9/1962 | Fulcher ......................... 52/109 |
| 3,074,079 | A | * | 1/1963 | Isaacson ......................... 4/500 |
| 3,112,135 | A | * | 11/1963 | Salomonson ................. 294/119 |
| 3,342,523 | A | | 9/1967 | Lutgen |
| 3,346,186 | A | | 10/1967 | Fulton et al. |
| 3,496,687 | A | | 2/1970 | Greenberg et al. |
| 3,526,365 | A | | 9/1970 | Darrow, Jr. |

(Continued)

OTHER PUBLICATIONS

"Notification of Transmittal of the International Search Report and the Written Opinion of the International Searching Authority, or the Declaration" relating to PCT Application No. PCT/US06/24642 (Jul. 27, 2007).

(Continued)

*Primary Examiner* — Alan B Waits
(74) *Attorney, Agent, or Firm* — Merchant & Gould P.C.

(57) ABSTRACT

A general purpose linkage apparatus is adaptable for moving or guiding objects along a linear or curvilinear path. The apparatus includes linkages with revolving joints. In self-powered adaptations, a rotating motor may extend and retract the apparatus.

35 Claims, 31 Drawing Sheets

(56) References Cited

U.S. PATENT DOCUMENTS

| | | |
|---|---|---|
| 3,711,146 A | 1/1973 | Madzsar et al. |
| 3,977,716 A | 8/1976 | Whited |
| 4,006,932 A | 2/1977 | McDonald |
| 4,117,900 A | 10/1978 | Amick |
| 4,126,974 A * | 11/1978 | Hardin ............................. 52/109 |
| 4,142,755 A | 3/1979 | Keedy |
| 4,154,149 A | 5/1979 | Holford |
| 4,236,745 A | 12/1980 | Davis |
| 4,248,103 A | 2/1981 | Halsall |
| 4,257,641 A | 3/1981 | Keedy |
| 4,349,155 A | 9/1982 | Donguy |
| 4,383,407 A | 5/1983 | Inman |
| 4,400,985 A | 8/1983 | Bond |
| RE31,565 E | 4/1984 | Beaulieu |
| 4,451,074 A | 5/1984 | Scanlon |
| 4,458,936 A | 7/1984 | Mulholland |
| 4,462,628 A | 7/1984 | Gregg |
| 4,489,889 A | 12/1984 | Inman |
| 4,508,380 A | 4/1985 | Sankrithi |
| 4,601,508 A | 7/1986 | Kerian |
| 4,651,589 A | 3/1987 | Lambert |
| 4,682,808 A | 7/1987 | Bilanin |
| 4,688,841 A | 8/1987 | Moore |
| 4,702,509 A | 10/1987 | Elliott, Sr |
| 4,722,500 A * | 2/1988 | Bray ............................. 248/49 |
| 4,741,569 A | 5/1988 | Sutphen |
| 4,747,353 A | 5/1988 | Watt |
| 4,784,429 A | 11/1988 | Hodges |
| 4,818,015 A | 4/1989 | Scanlon |
| 4,944,550 A | 7/1990 | Drown et al. |
| 4,978,162 A | 12/1990 | Labbe |
| 5,058,945 A | 10/1991 | Elliott, Sr. et al. |
| 5,156,195 A | 10/1992 | Wehler et al. |
| 5,190,342 A | 3/1993 | Marlowe et al. |
| 5,236,347 A | 8/1993 | Andrus |
| 5,237,887 A | 8/1993 | Appleberry |
| 5,332,280 A | 7/1994 | Dupont |
| 5,348,366 A | 9/1994 | Baker et al. |
| 5,375,903 A | 12/1994 | Lechner |
| 5,498,059 A | 3/1996 | Switlik |
| 5,609,384 A | 3/1997 | Loewen |
| 5,823,610 A | 10/1998 | Ryan et al. |
| 5,857,648 A | 1/1999 | Dailey et al. |
| 5,876,008 A | 3/1999 | Sweere et al. |
| 5,947,548 A | 9/1999 | Carper et al. |
| 6,092,861 A | 7/2000 | Whelan |
| 6,105,454 A | 8/2000 | Bacchi et al. |
| 6,205,772 B1 | 3/2001 | Perrier et al. |
| 6,257,654 B1 | 7/2001 | Boivin et al. |
| 6,286,892 B1 | 9/2001 | Bauer et al. |
| 6,286,894 B1 | 9/2001 | Kingham |
| 6,309,010 B1 | 10/2001 | Whitten |
| 6,409,252 B1 | 6/2002 | Andrus |
| 6,418,710 B1 | 7/2002 | Perrier et al. |
| 6,457,766 B1 | 10/2002 | Telnack |
| 6,467,833 B1 | 10/2002 | Travers |
| 6,485,087 B1 | 11/2002 | Roberge et al. |
| 6,666,498 B1 | 12/2003 | Whitten |
| 6,669,270 B1 | 12/2003 | Card et al. |
| 6,789,839 B1 | 9/2004 | Samuelson |
| 6,799,791 B2 | 10/2004 | Reiman et al. |
| 6,846,035 B2 | 1/2005 | Wong et al. |
| 6,854,788 B1 | 2/2005 | Graham |
| 6,886,882 B2 | 5/2005 | Farlow et al. |
| 6,915,611 B2 | 7/2005 | Reiman et al. |
| 7,287,628 B2 | 10/2007 | Salesse et al. |
| 7,374,229 B1 | 5/2008 | Noll et al. |
| 7,374,230 B2 | 5/2008 | Breidenbach |
| 7,380,868 B2 | 6/2008 | Breidenbach |
| 7,404,592 B2 | 7/2008 | Reiman et al. |
| 7,472,622 B2 | 1/2009 | Isobe et al. |
| 7,549,695 B2 | 6/2009 | Royer |
| 7,618,086 B2 | 11/2009 | Breidenbach |
| 7,641,262 B2 | 1/2010 | Nusbaum |
| 7,726,724 B2 | 6/2010 | Kohls |
| 7,784,854 B2 | 8/2010 | Breidenbach |
| 7,845,708 B2 | 12/2010 | Breidenbach |
| 7,850,224 B2 | 12/2010 | Breidenbach |
| 7,857,376 B2 | 12/2010 | Breidenbach |
| 7,942,466 B2 | 5/2011 | Reiman et al. |
| 2002/0005655 A1 | 1/2002 | Bauer et al. |
| 2002/0021023 A1 | 2/2002 | Leban |
| 2002/0030384 A1 | 3/2002 | Basford |
| 2003/0205913 A1 | 11/2003 | Leonard |
| 2005/0204681 A1* | 9/2005 | Zeigler ............................. 52/646 |
| 2007/0200390 A1 | 8/2007 | Lotarev et al. |
| 2008/0309122 A1 | 12/2008 | Smith et al. |
| 2009/0212595 A1 | 8/2009 | Heppel et al. |

OTHER PUBLICATIONS

U.S. Appl. No. 12/872,133, titled "Aerodynamic Drag Reducing Apparatus", filed Aug. 31, 2010 by Thomas S. Breidenbach.

U.S. Appl. No. 12/962,040, titled "Aerodynamic Drag Reducing Apparatus", filed Dec. 7, 2010 by Thomas S. Breidenbach.

U.S. Appl. No. 12/967,758 titled "Aerodynamic Drag Reducing Apparatus", filed Dec. 14, 2010 by Thomas S. Breidenbach.

U.S. Appl. No. 12/980,044 titled "Aerodynamic Drag Reducing Apparatus", filed Dec. 28, 2010 by Thomas S. Breidenbach.

* cited by examiner

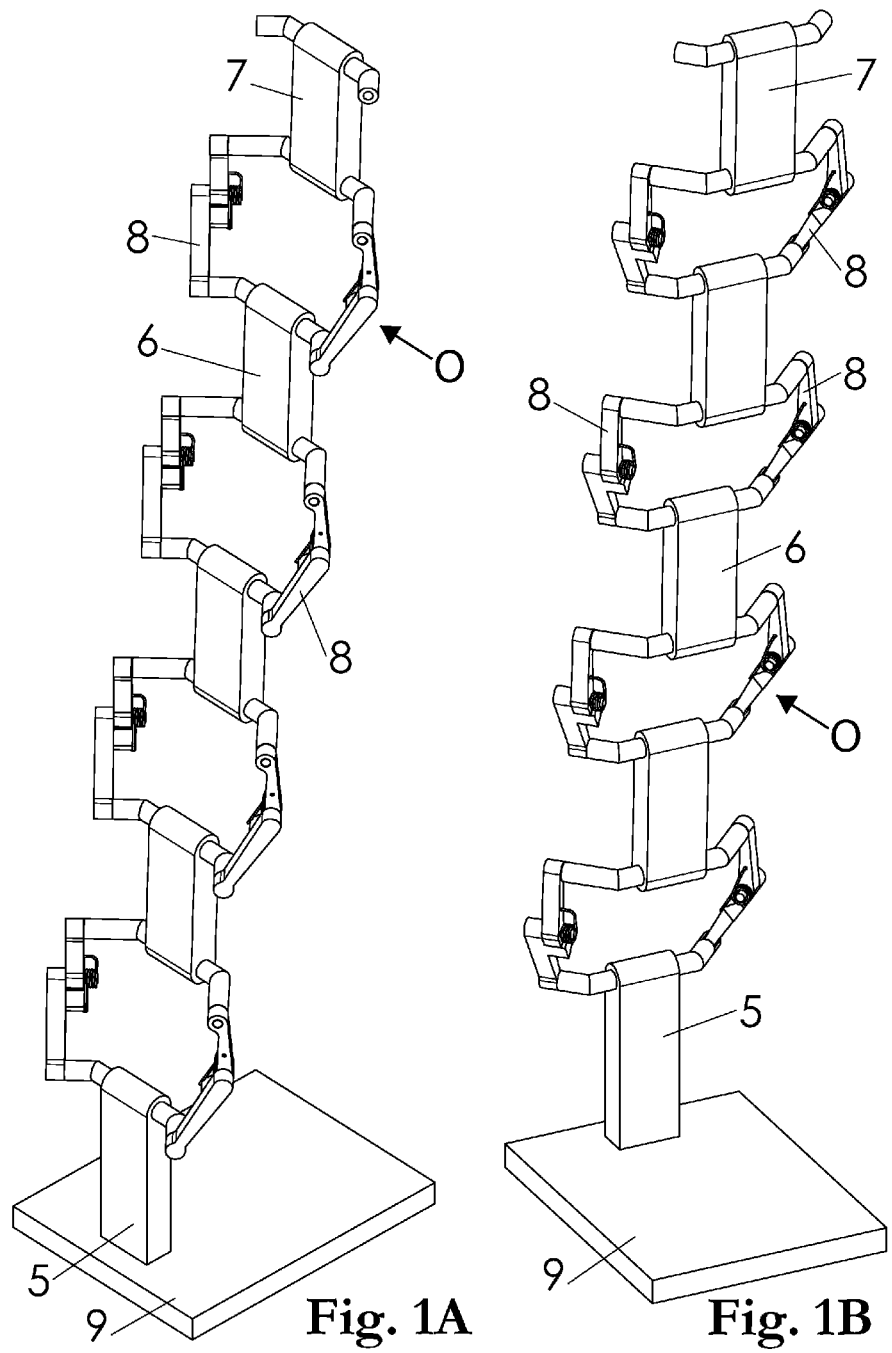

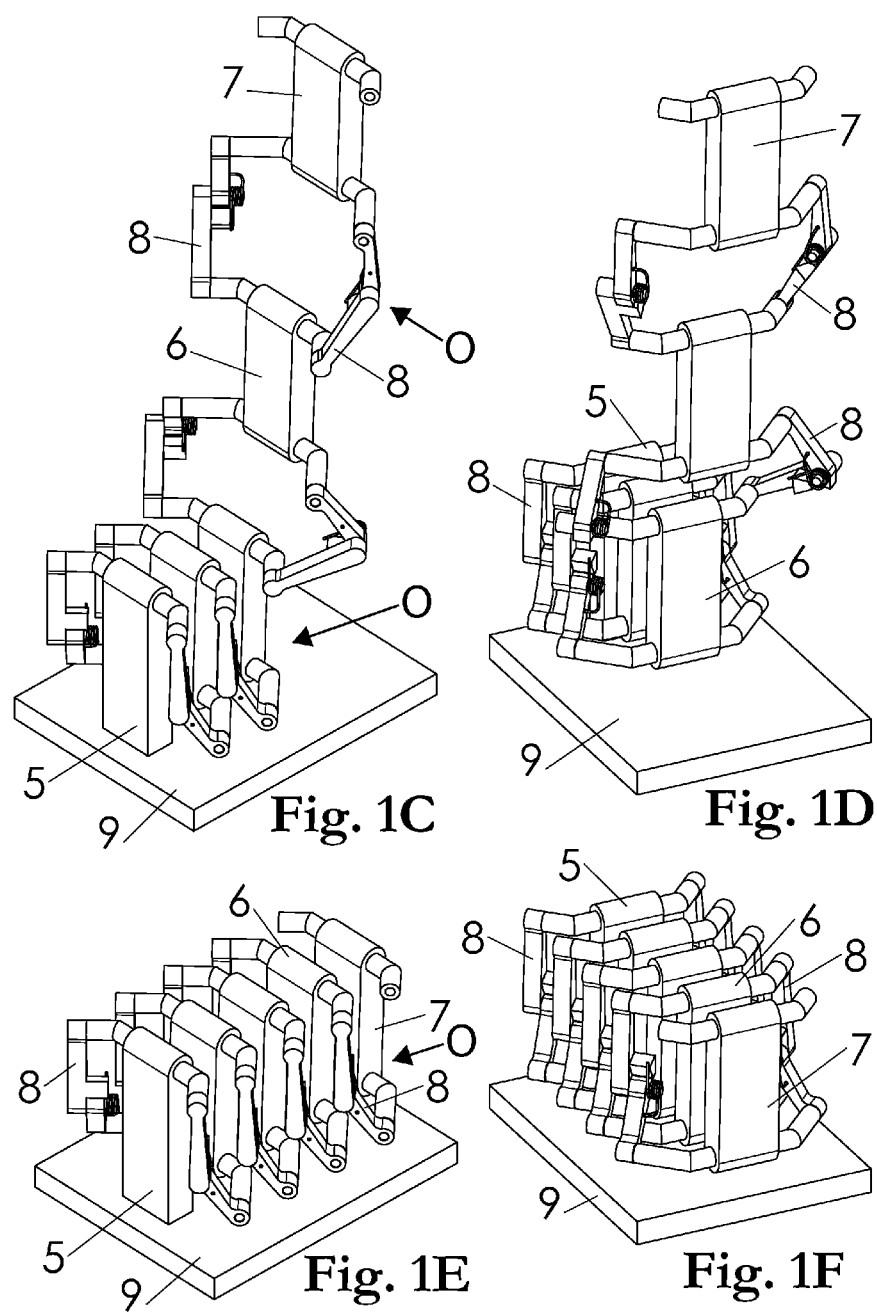

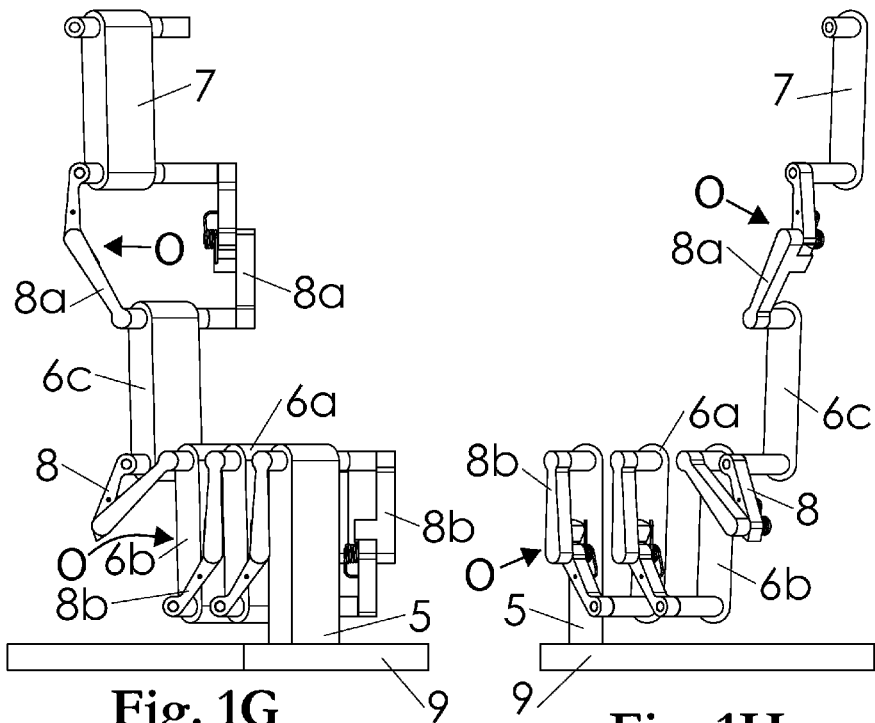
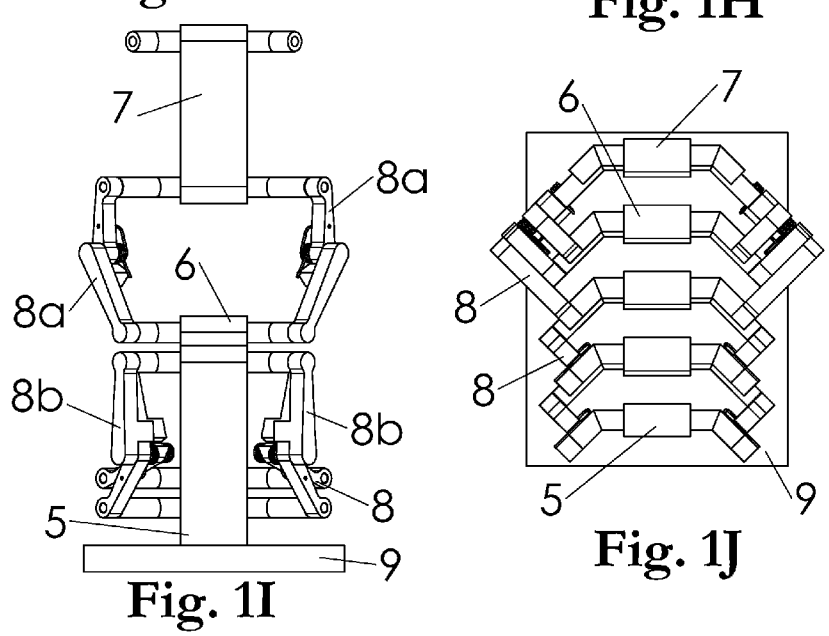

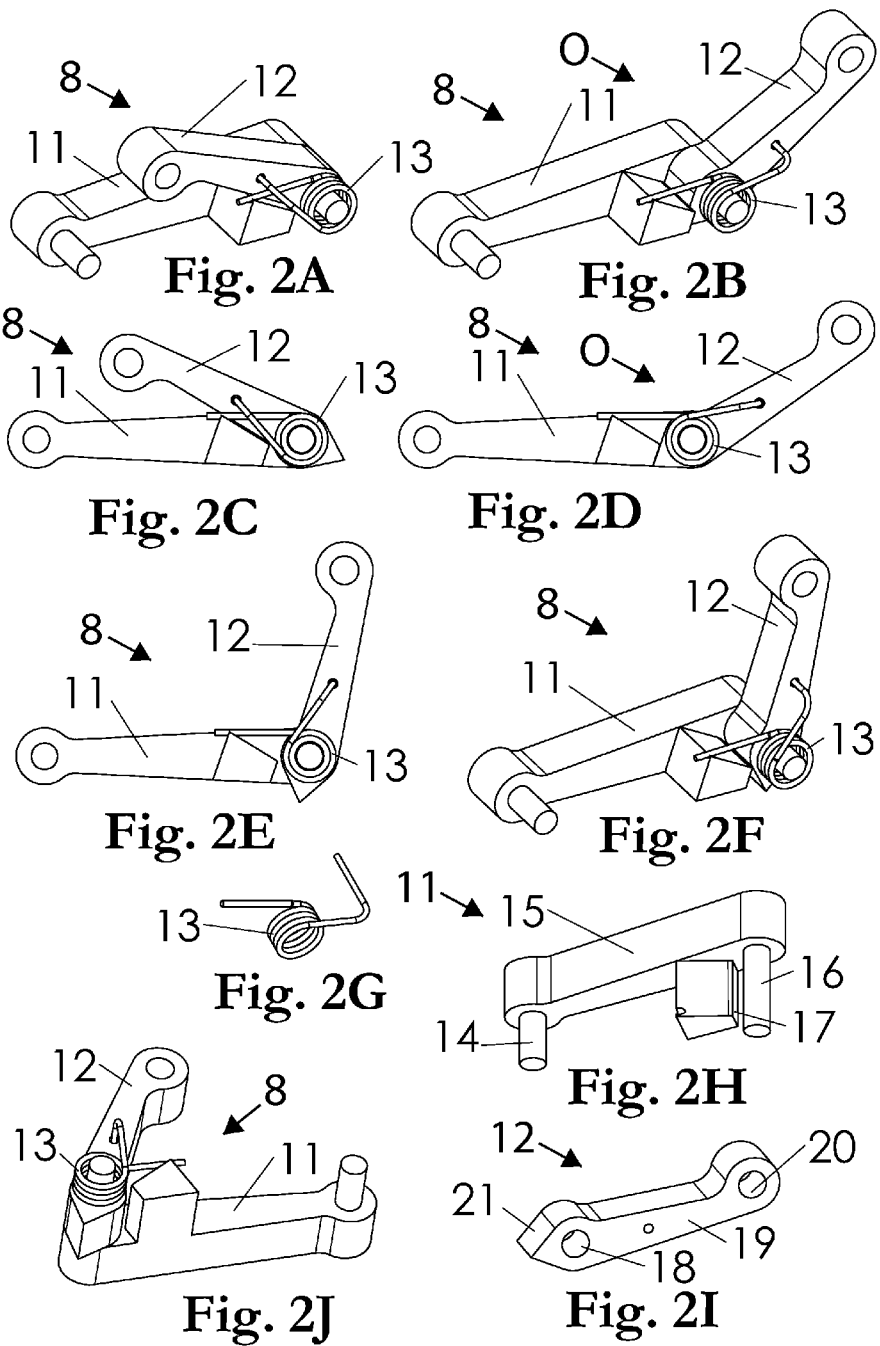

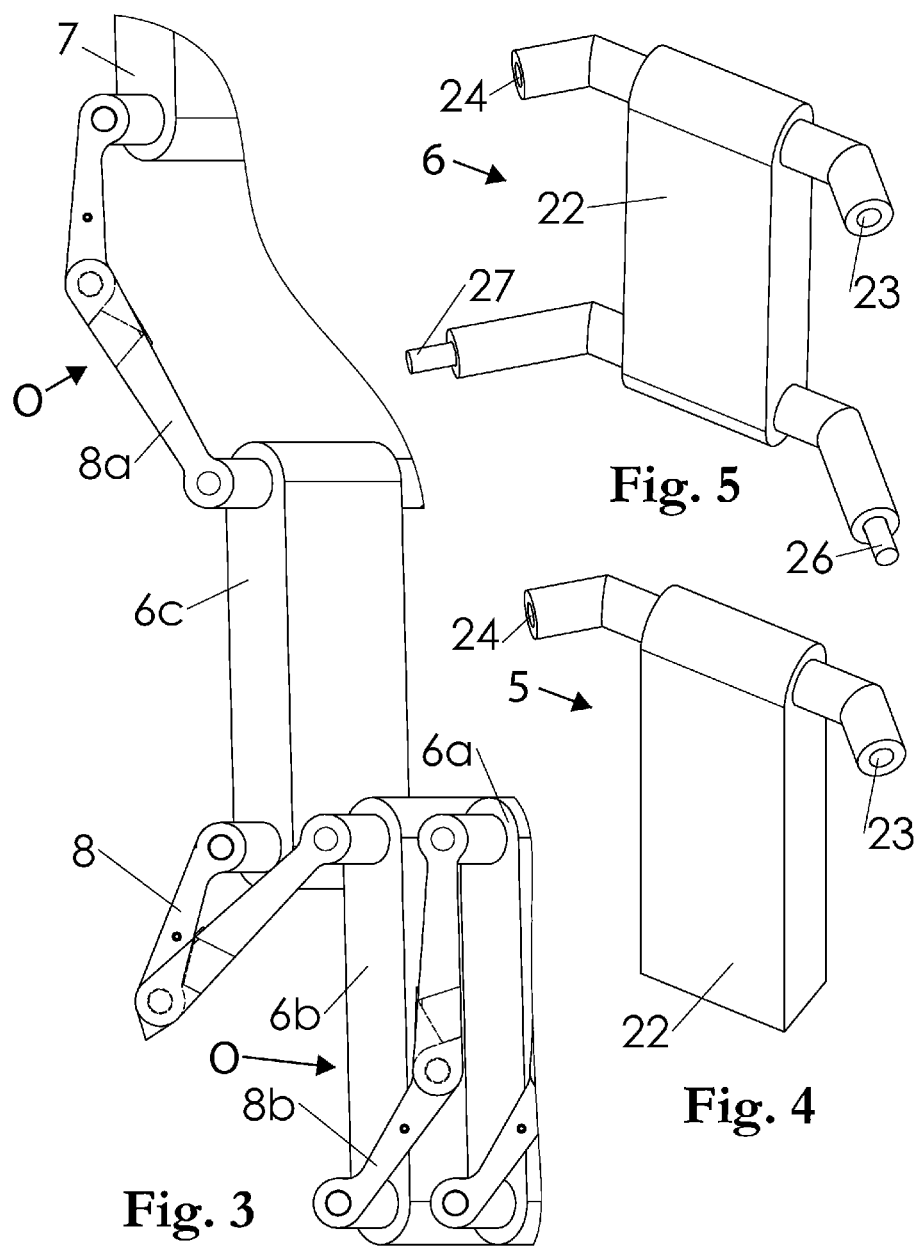

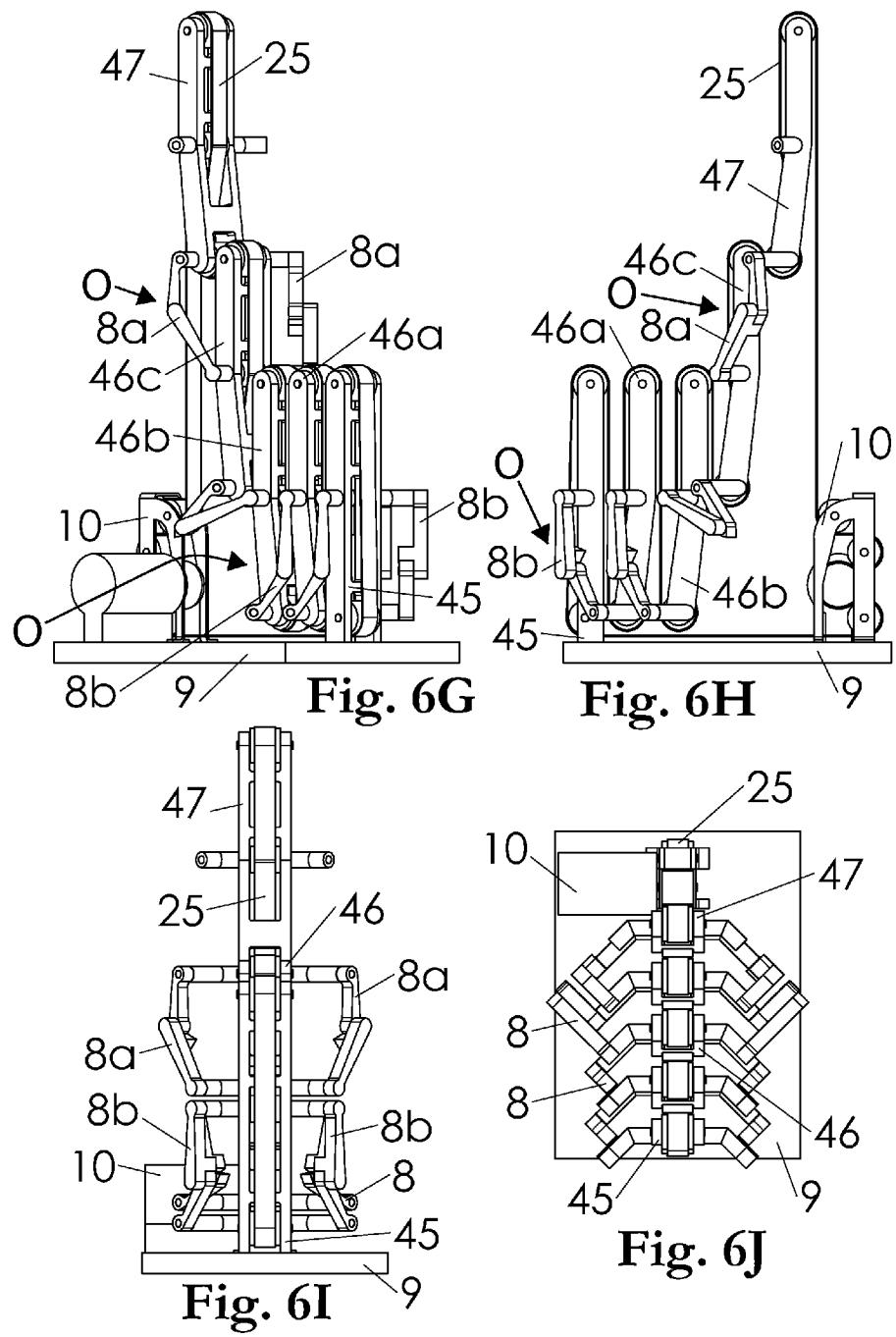

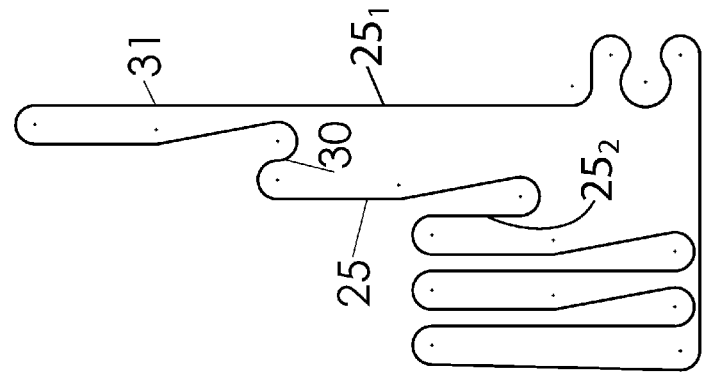
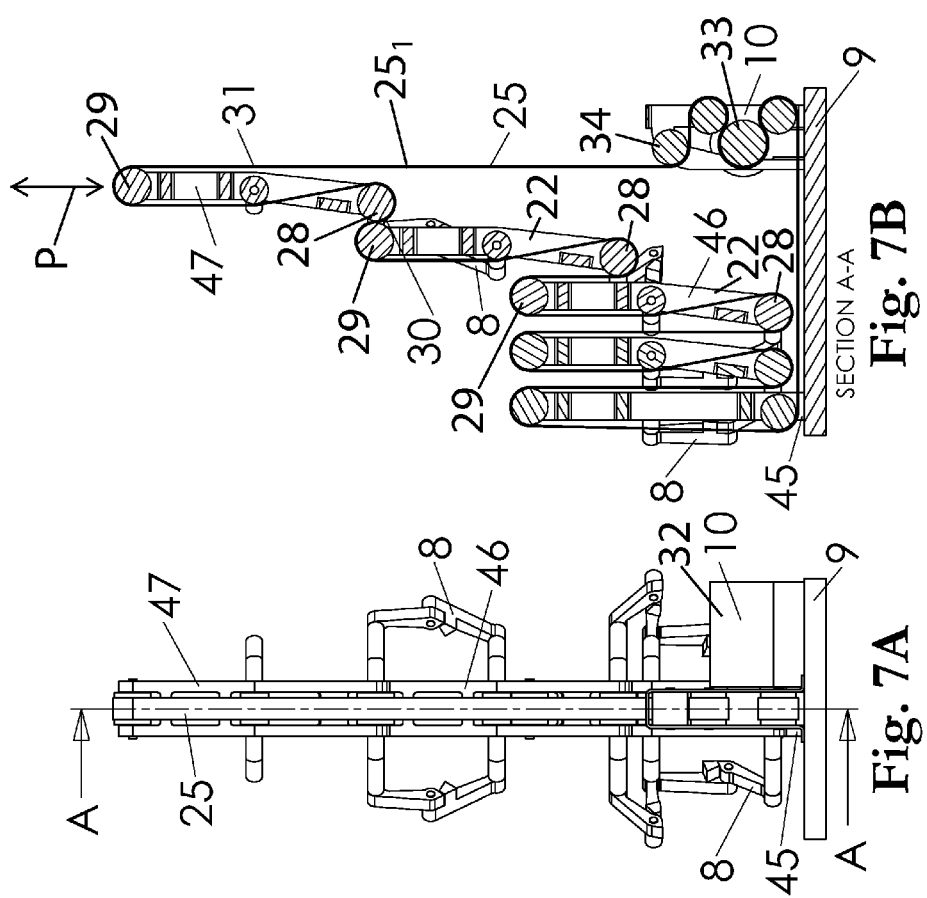
Fig. 7C
Fig. 7B
Fig. 7A

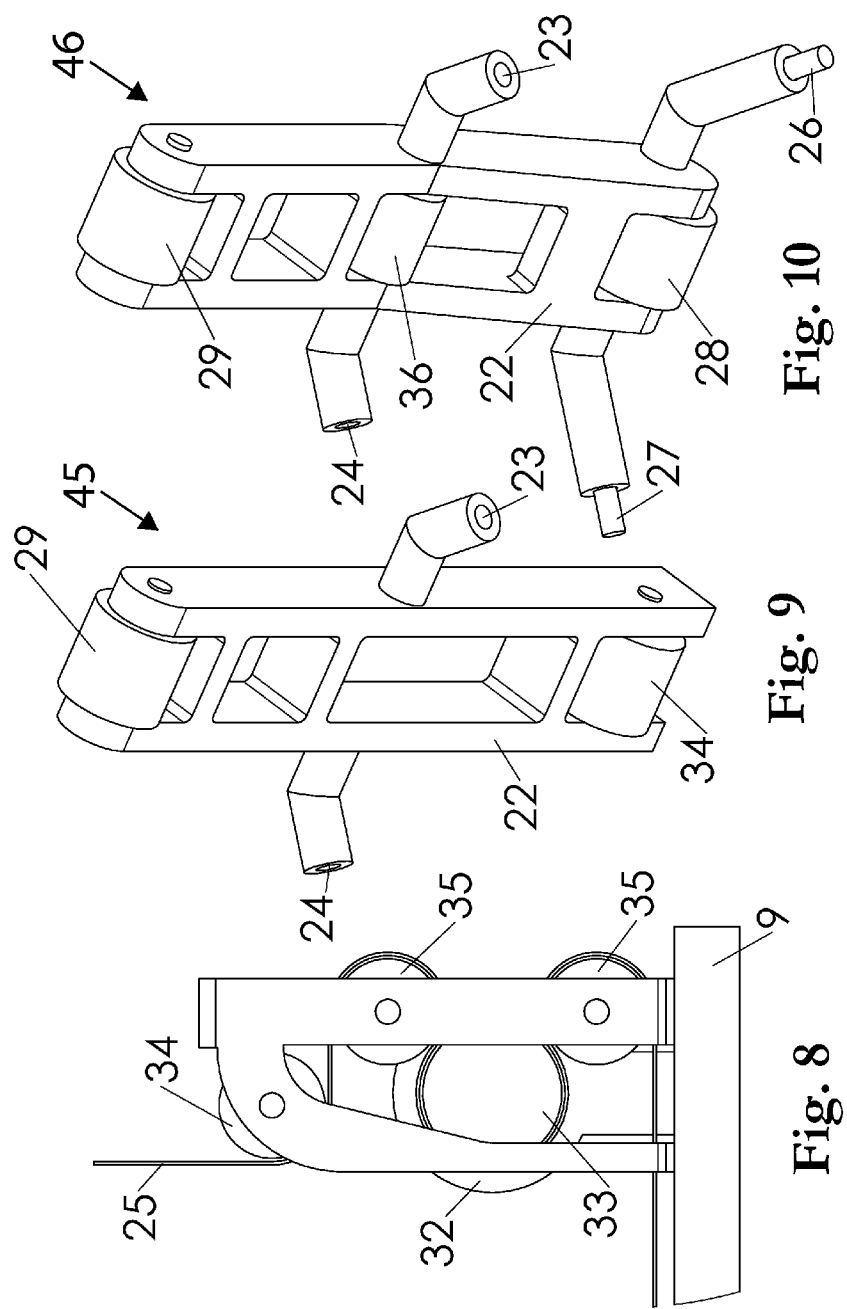

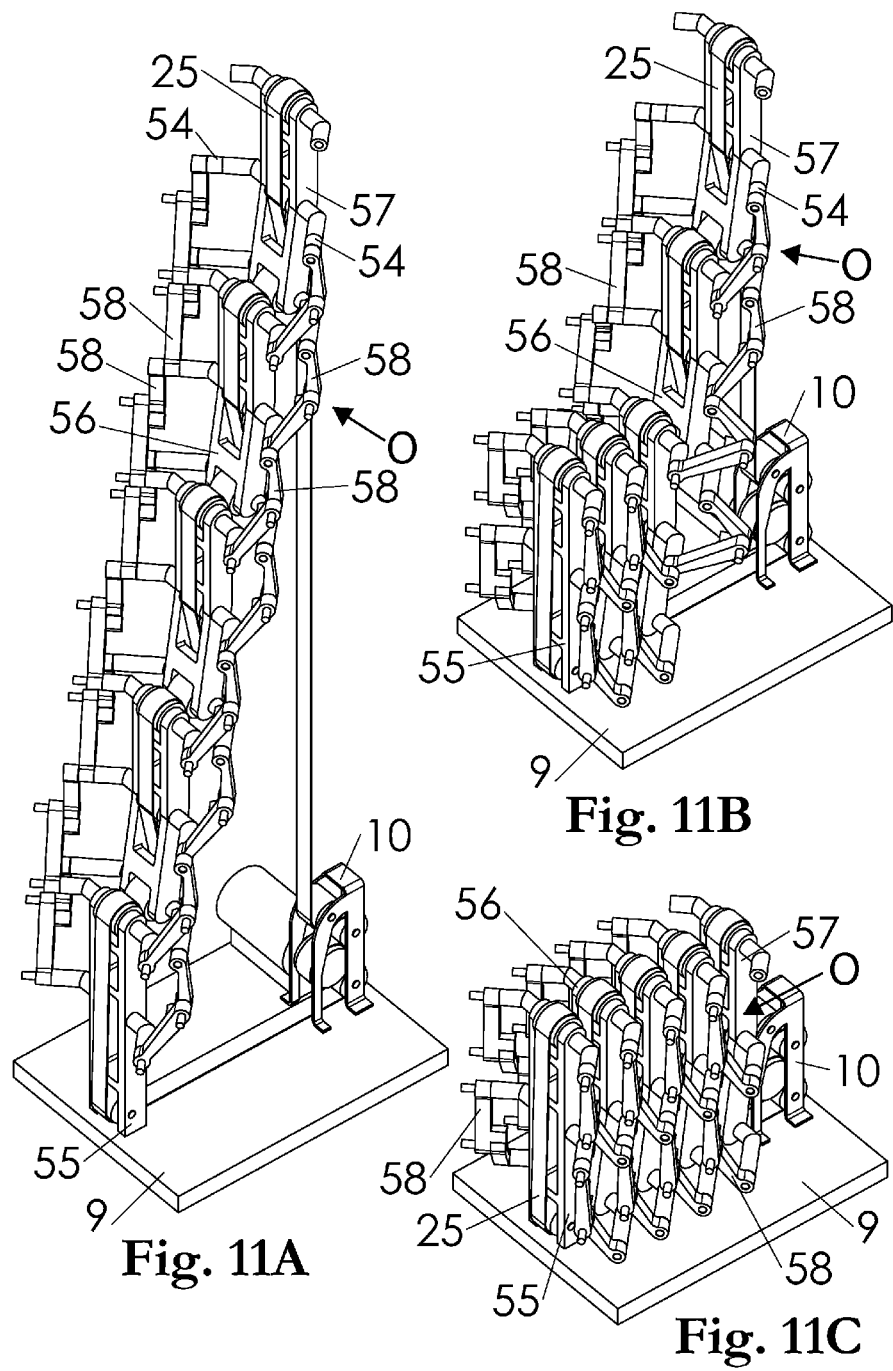

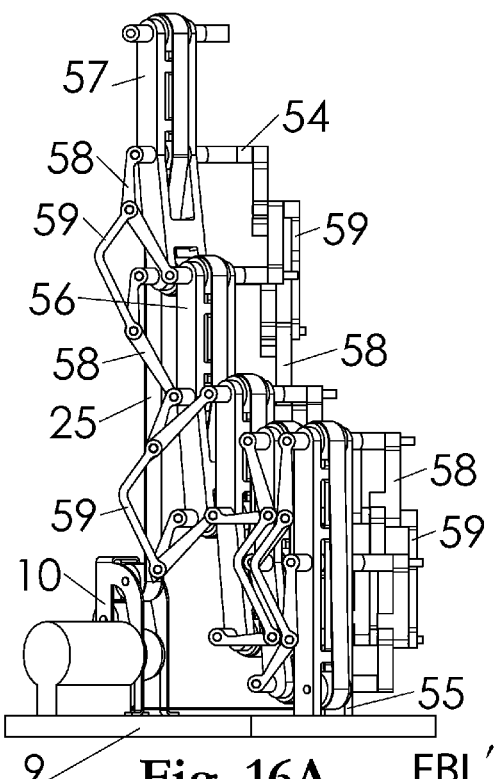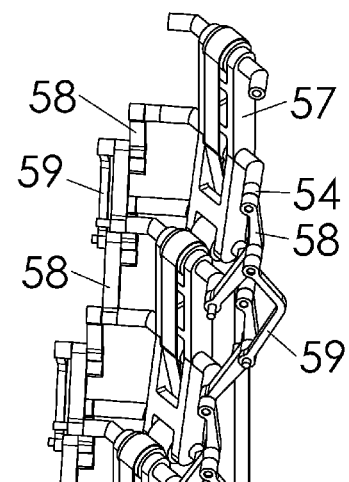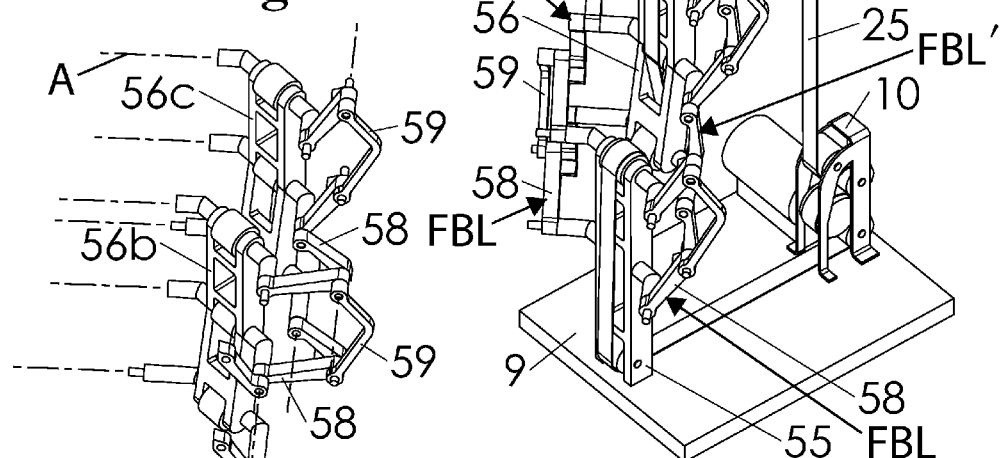
Fig. 16A
Fig. 16B
Fig. 16C

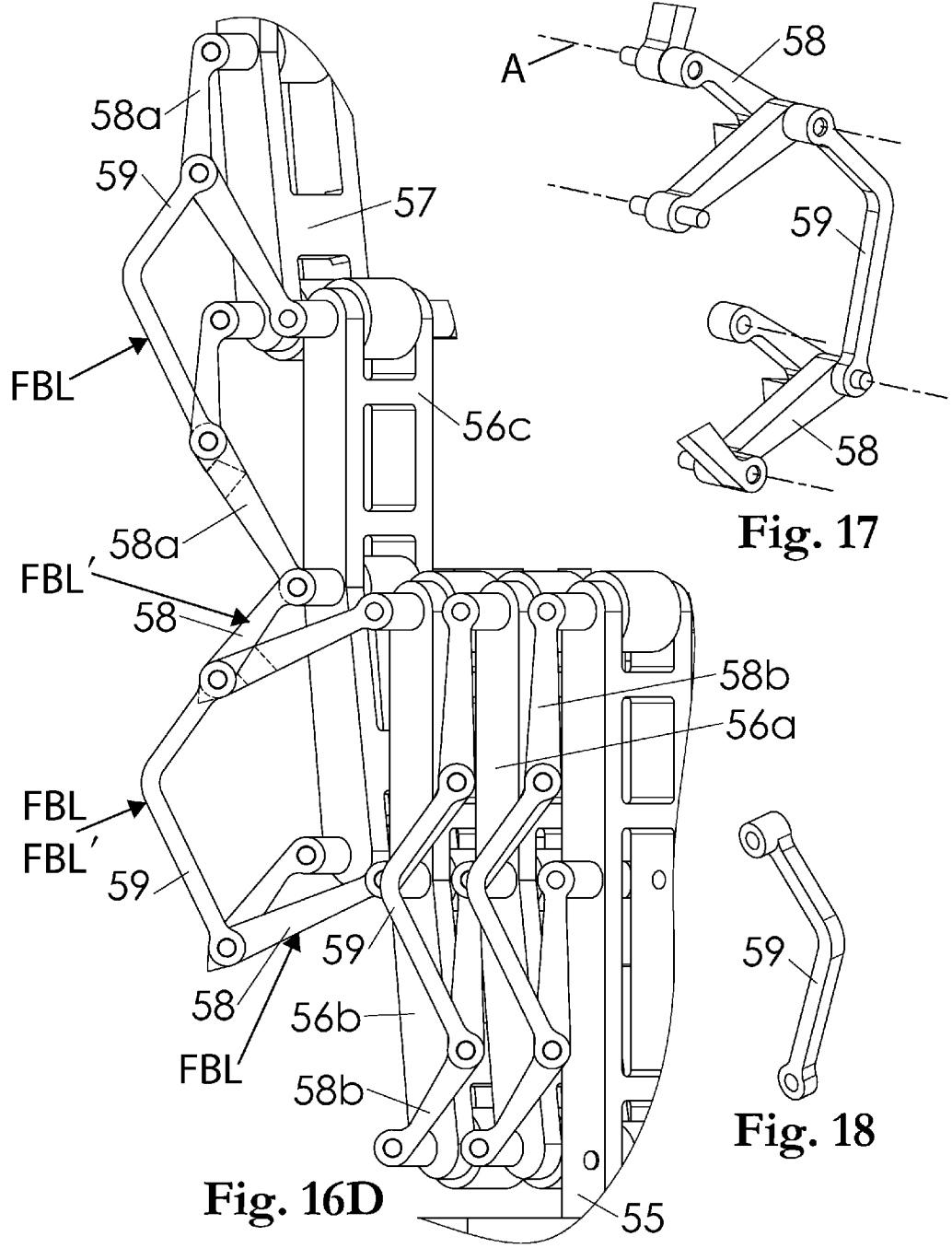

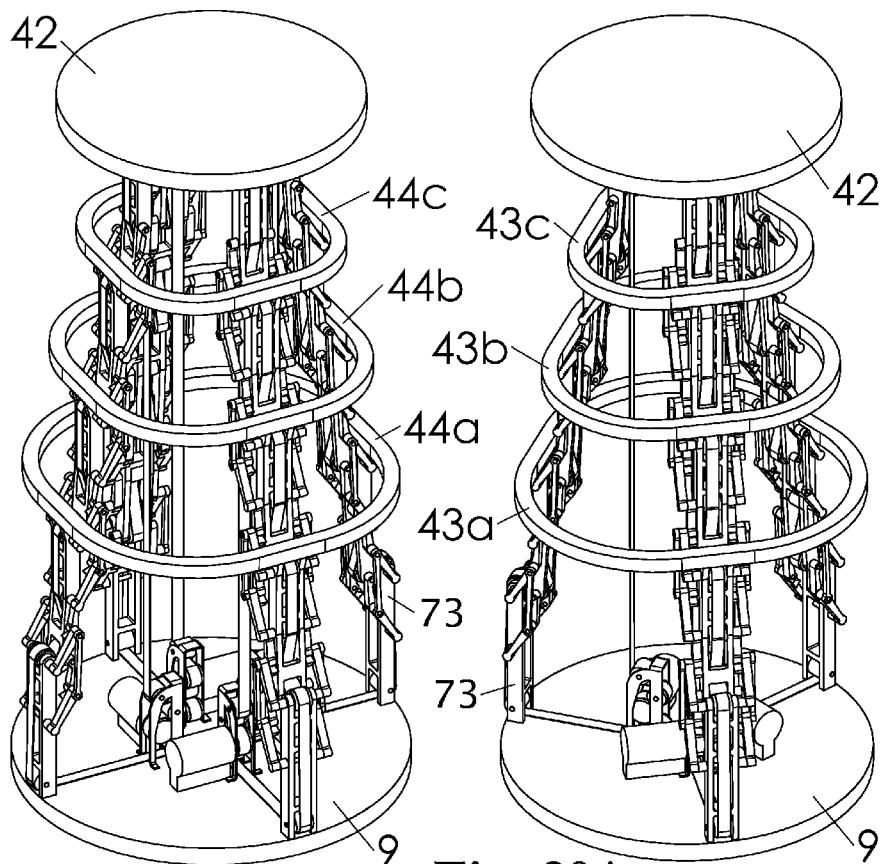
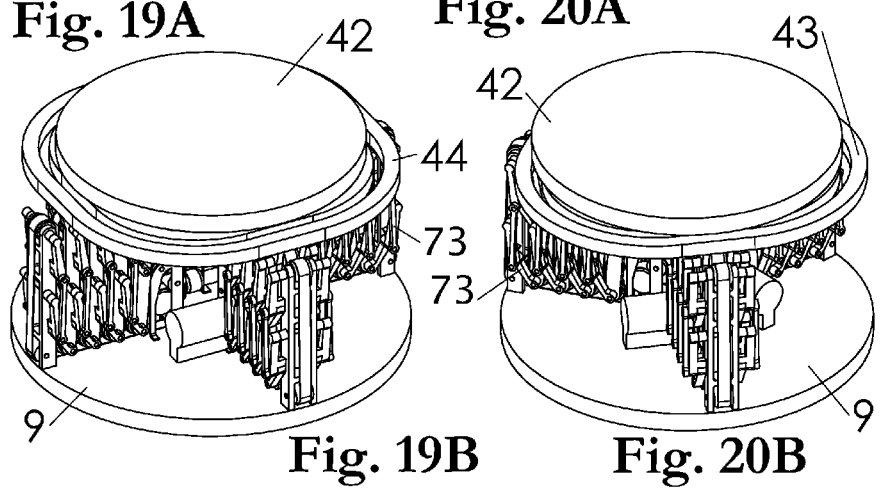
Fig. 19A  Fig. 20A
Fig. 19B  Fig. 20B

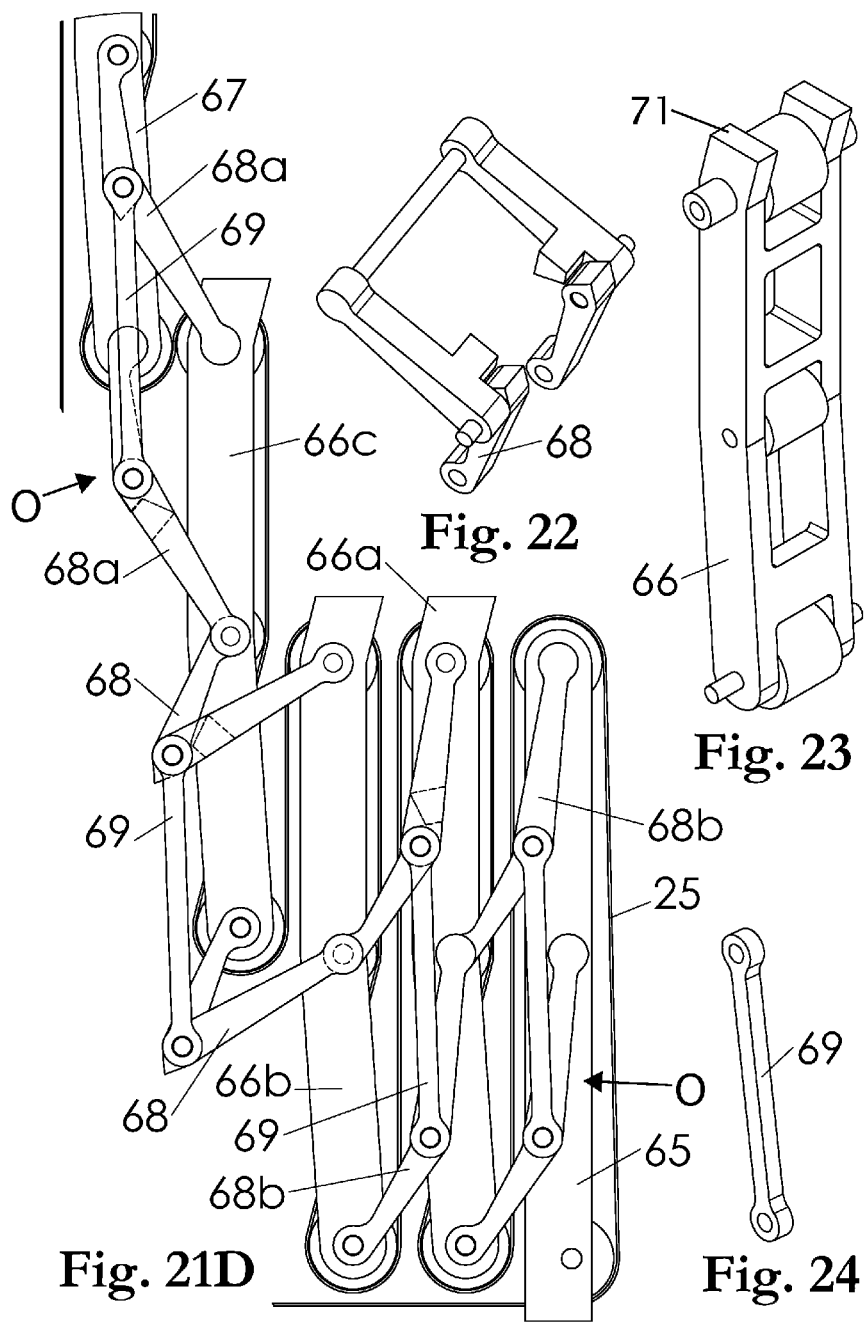

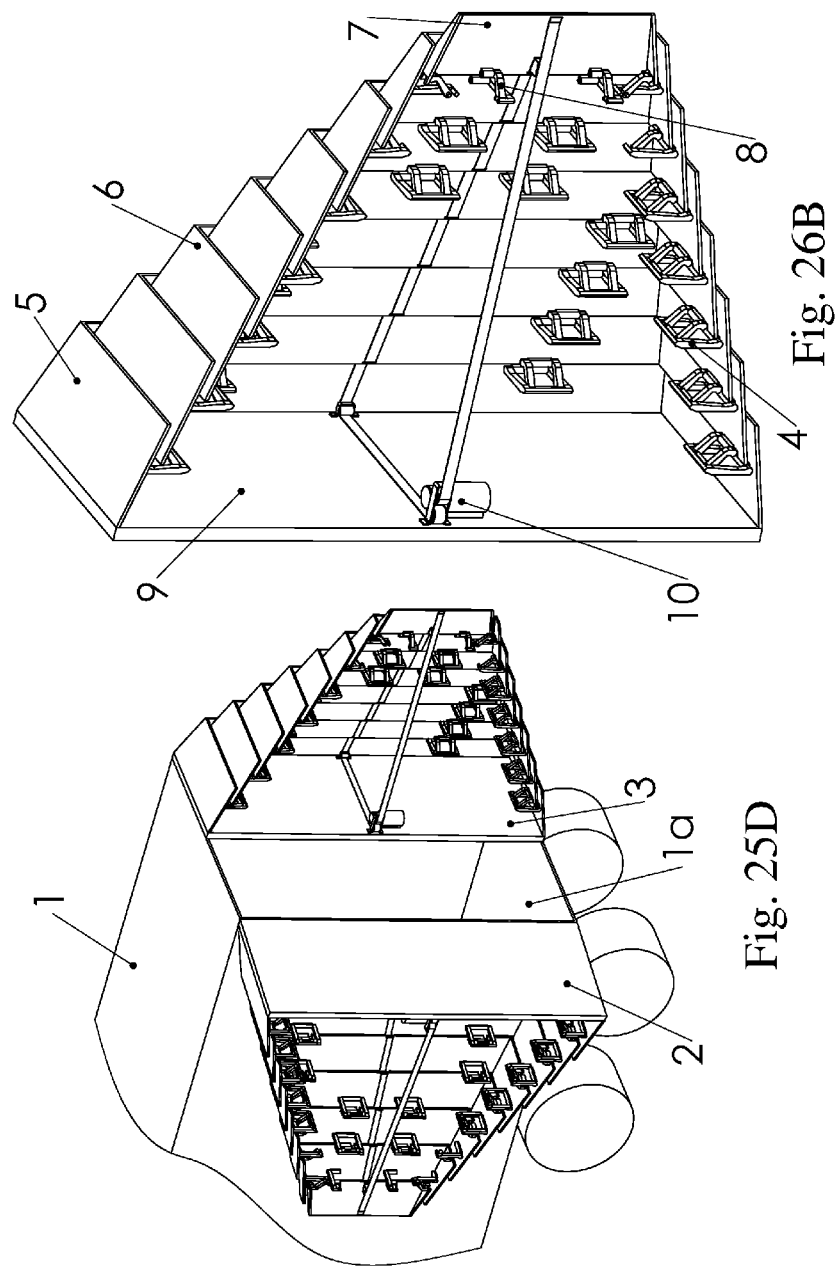

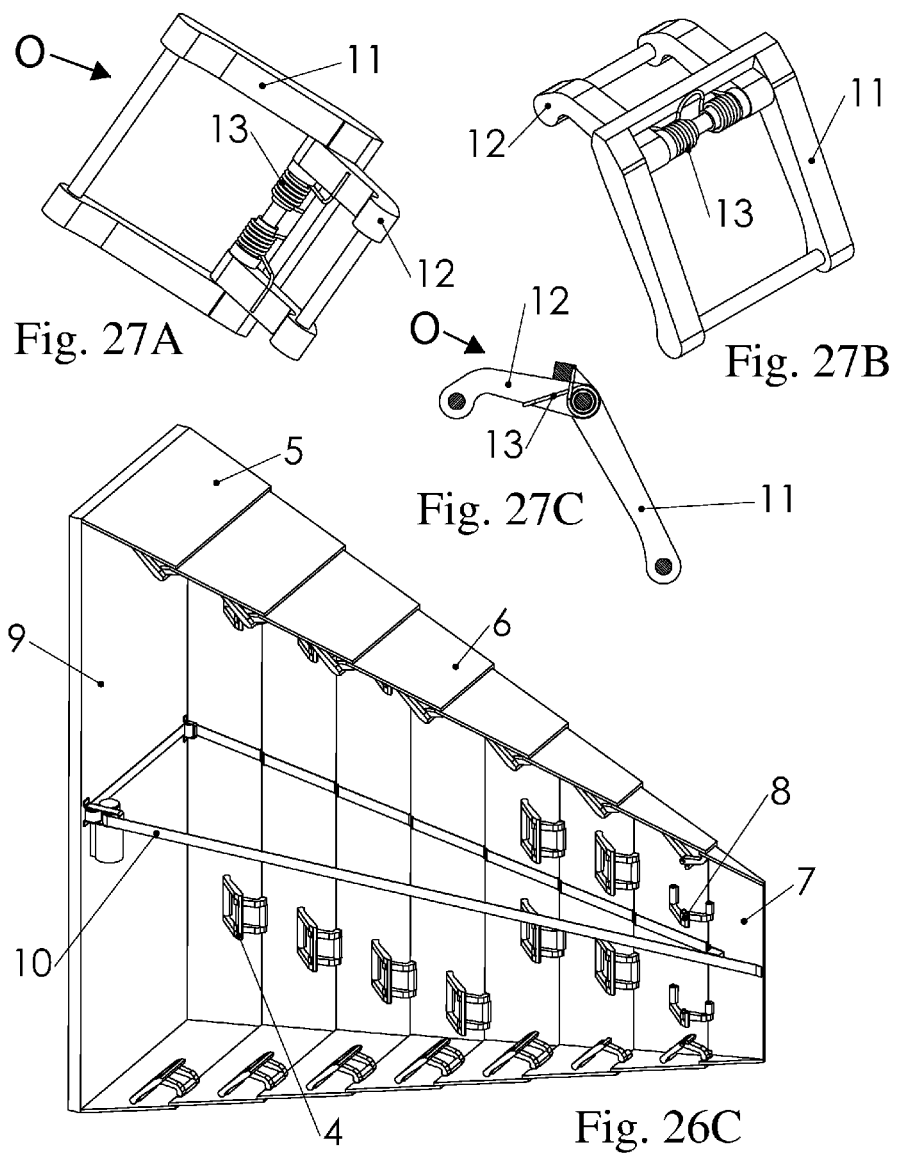

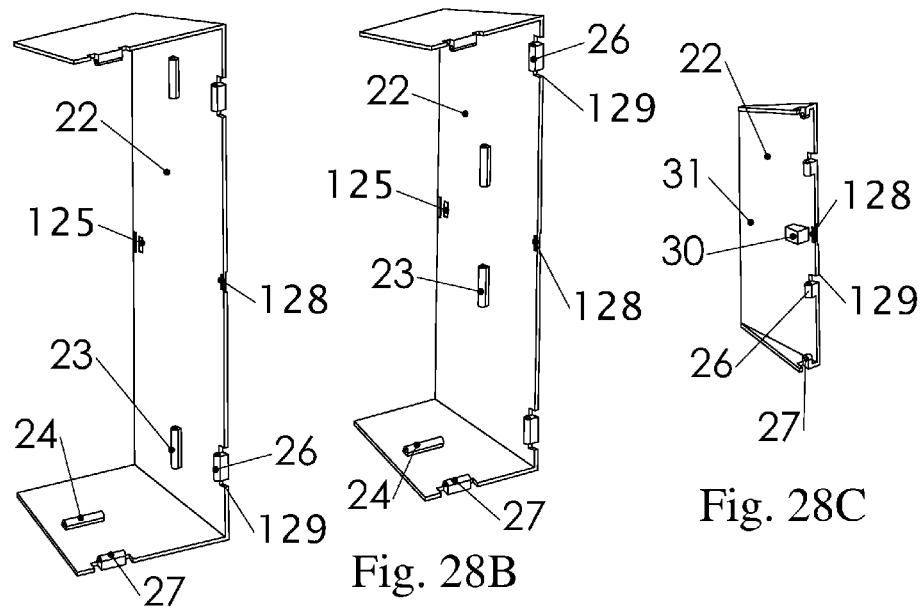
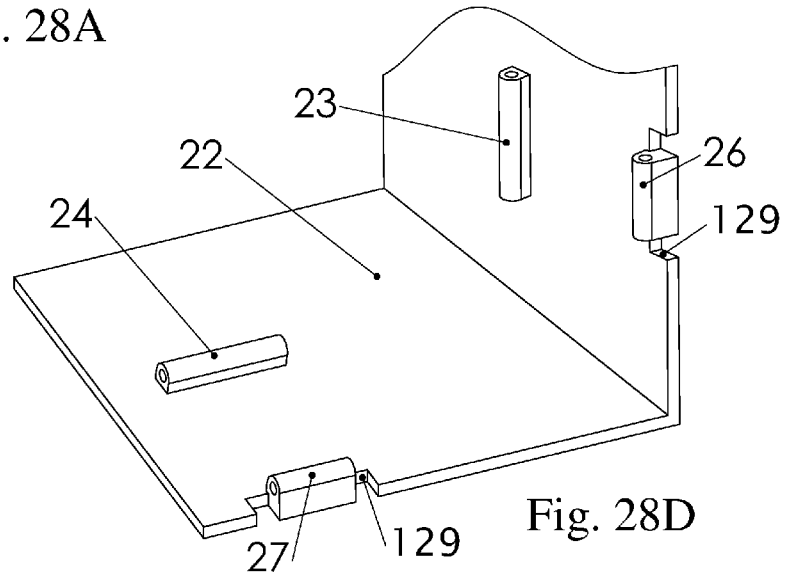

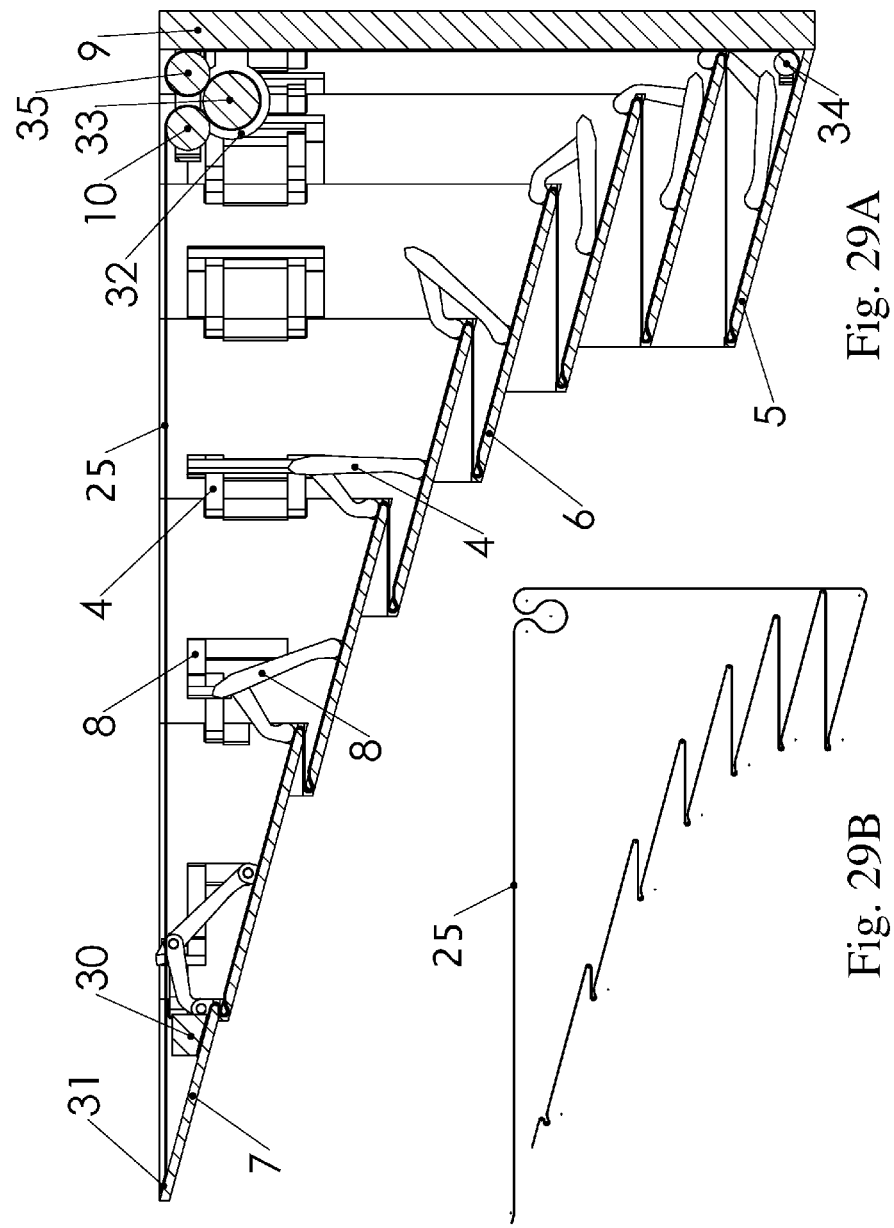

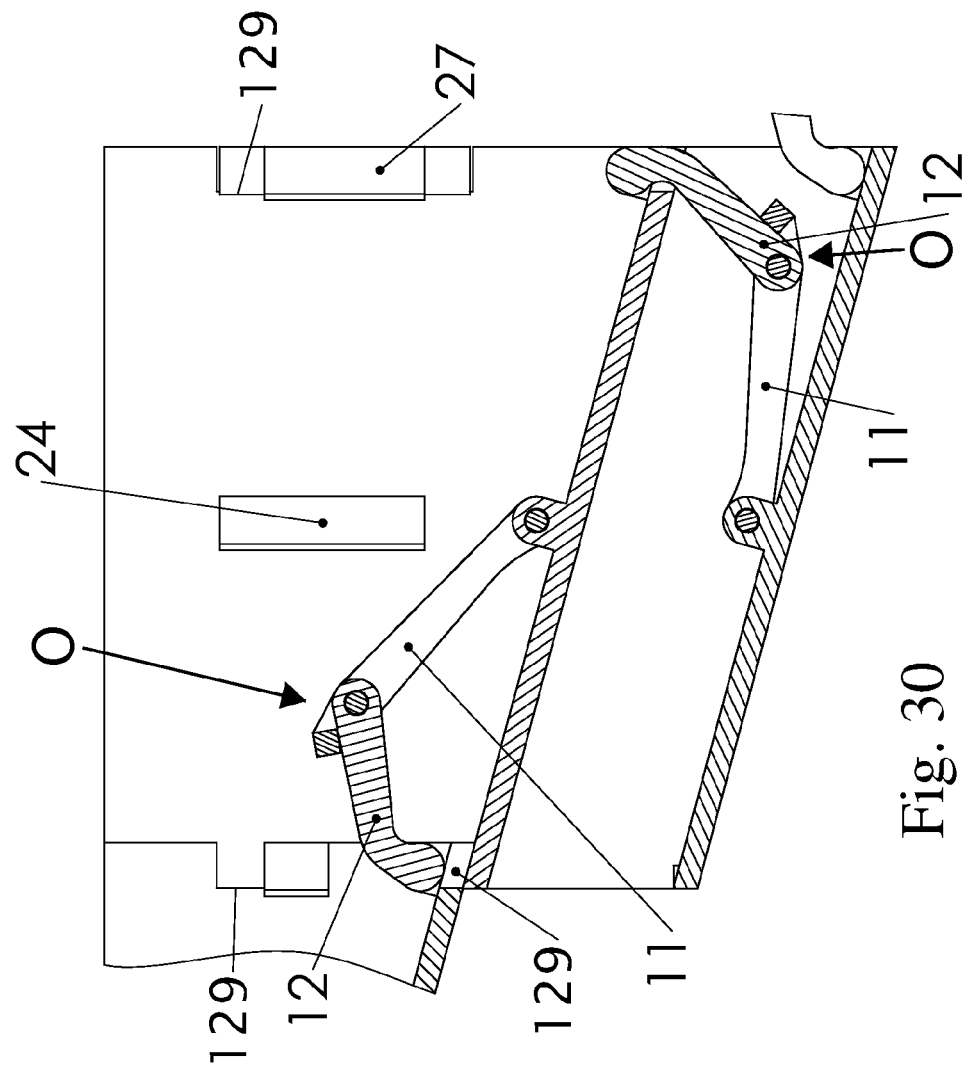

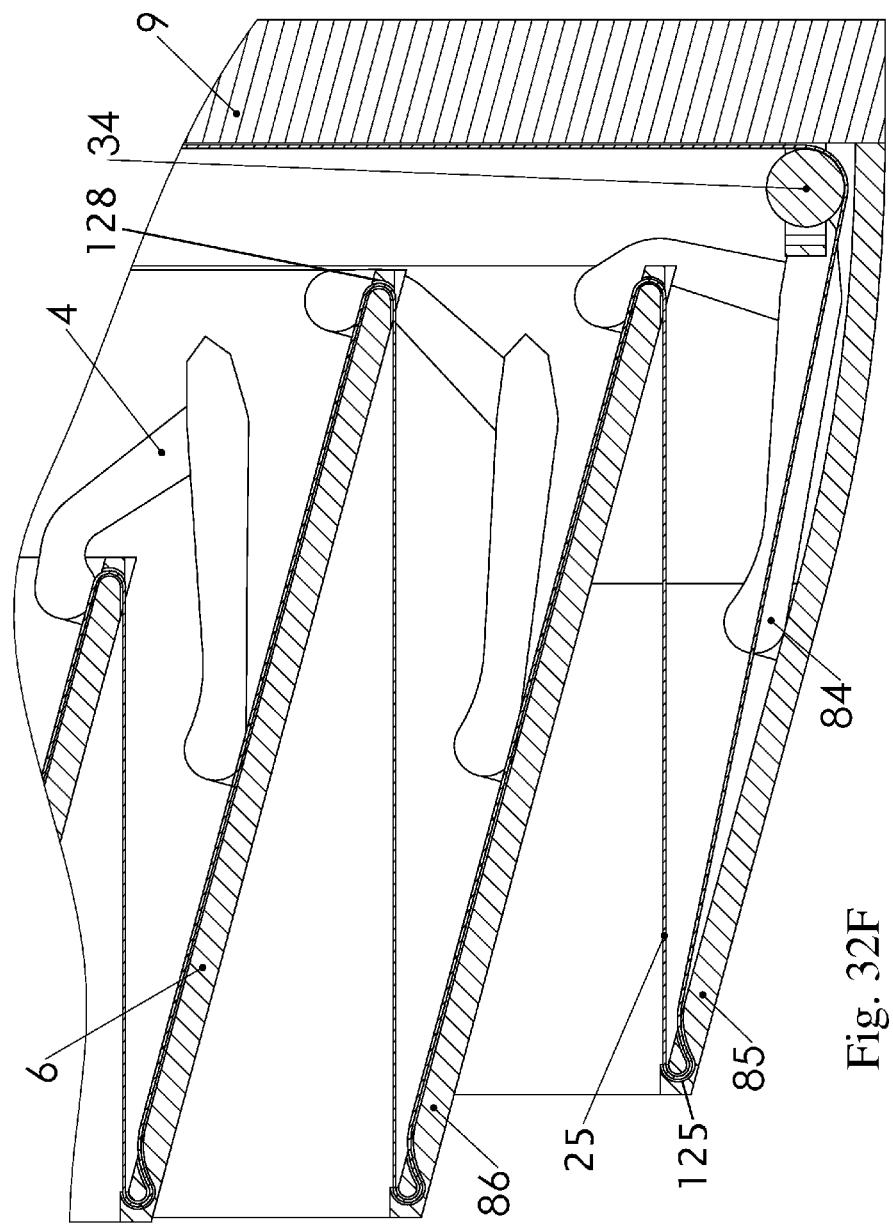

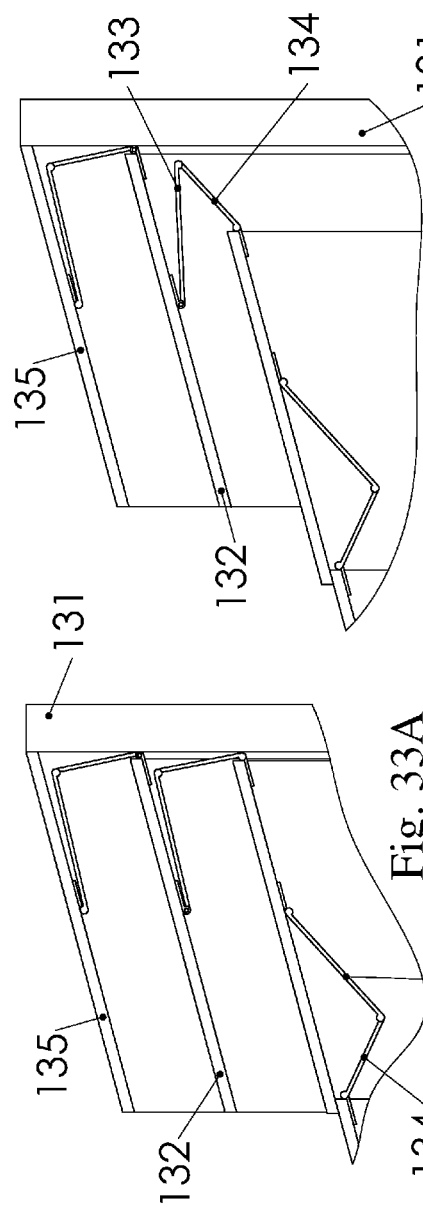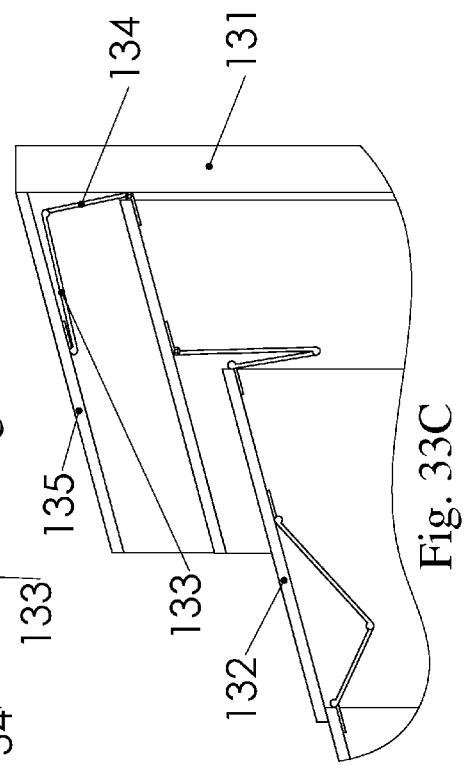
Fig. 33A
Fig. 33B
Fig. 33C

LINEAR-CURVILINEAR ACTUATING APPARATUS WITH ROTATING JOINTS

CROSS REFERENCE TO RELATED APPLICATIONS

This application is a continuation-in-part of U.S. Nonprovisional patent application Ser. No. 11/425,854; filed Jun. 22, 2006, now U.S. Pat. No. 7,380,868, which claims the benefit of U.S. Provisional Patent Application Ser. No. 60/694,865, filed Jun. 29, 2005, U.S. Provisional Patent Application Ser. No. 60/705,026, filed Aug. 2, 2005, and U.S. Provisional Patent Application Ser. No. 60/705,029, filed Aug. 3, 2005, which applications are hereby incorporated by reference in their entirety; and, this application claims the benefit of U.S. Provisional Patent Application Ser. No. 60/822,058, filed Aug. 10, 2006, which application is hereby incorporated by reference in its entirety.

FIELD OF THE INVENTION

The present disclosure relates to powered actuators, telescoping actuators, movement constraining guides, linkages, toggles, multi-stage toggles, and collapsible/retractable structures. The present disclosure may be adapted for use in devices such as man-lifts, retractable video monitor supports, forklifts, and robotic linkages and may be integrated with devices such as collapsible enclosures.

BACKGROUND OF THE INVENTION

The need to move people and material in a prescribed, repeatable, and dependable manner has been addressed by numerous mechanisms. Multi-segment scissor lifts are used to elevate workers many times their own height. Forklifts allow warehouses to have high shelves yet easily store and retrieve objects. Basketball backboards often have toggling linkages that allow them to be reconfigured to several discrete and stable heights. Stadiums with retractable roofs have mechanisms that deploy large roof panels when closed and stow the panels when open. There is a need for a compact apparatus with rotating joints to serve these and other applications. The present disclosure fulfills these and other needs.

BRIEF SUMMARY OF THE INVENTION

The present disclosure is adaptable to the above applications and others requiring movement along a prescribed path. In externally powered embodiments of the present disclosure, revolving and/or equivalent joints provide kinematic function. Certain self-powered embodiments employ a tension member such as a web, cable, or chain to provide powered extension and retraction using a rotational motor. This invention may be structured with multiple segments that move in series. Each segment can be connected to an external object to guide and/or actuate that object.

The present disclosure is concerned with providing a multi-purpose linkage apparatus. The apparatus can be oriented for extension in any direction including vertically upwards and downwards as well as sideways. The apparatus has several embodiments suited to match the requirements of various applications.

A first and most basic embodiment simply provides a path with end limits to guide externally connected objects. With an exception of gravitational and inertial loads, this embodiment is powered by external movement. Each segment of the apparatus may be used concurrently for this purpose.

A second embodiment adds springs to the revolving or equivalent joints in the linkage. The springs may indirectly apply loads to external objects connected to any or all of the segments of the apparatus. The springs may also result in one or more discrete stable configurations. In this case, if an external load disturbs the apparatus from a stable configuration, the apparatus will initially generate a restoring load to return the apparatus to the stable configuration. If the external load and movement caused by it are large enough, the apparatus may seek a different stable configuration. In addition to any discrete stable configurations along the range of motion, the apparatus is stable at a fully extended configuration and a fully retracted configuration. This behavior is useful when the apparatus is used to hold an external object steady at several discrete positions. The springs of this embodiment may be combined with other embodiments of the apparatus.

A third embodiment adds dampers and/or friction to joints in the linkage. The dampers may be combined with other embodiments of the apparatus.

A fourth embodiment adds linear movement along an axis of rotation to some or all of the joint axes. This movement may be achieved by placing a barrel cam, lead screw, linear spring and detent, or a combination of these devices on the joint axis. The joint devices of this embodiment may be combined with other embodiments of the apparatus.

A fifth embodiment adds a rotational motor/generator and a tension member connected to the motor/generator by a pulley. Rotation by the motor in one direction causes the apparatus to extend. Continued rotation in this direction will eventually cause the apparatus to become fully extended. Rotation by the motor in the opposite direction causes the apparatus to retract. Continued rotation in this direction will eventually cause the apparatus to become fully retracted. Power may flow to or from the motor/generator. The tension member may be shared with a brake. The motor/generator, pulley, and/or tension member of this embodiment may be combined with other embodiments.

A sixth embodiment adds a torsional spring and a tension member connected to the torsional spring by a pulley. The torsional spring may be multi-turn. Similar to the fifth embodiment, rotation of the pulley and torsional spring in one direction causes the apparatus to expand while rotation in the opposite direction causes the apparatus to retract. The torsional spring may be configured to extend the apparatus to its fully extended configuration in the absence of other loads. It may, likewise, be configured to fully retract the apparatus. Alternatively, a neutral position of the spring may be set between the fully extended and fully retracted positions of the apparatus. The spring rate may also be varied and even nonlinear. The torsional spring, pulley, and/or tension member of this embodiment may be combined with other embodiments.

A seventh embodiment adds a rotational brake/damper and a tension member constrained by the brake/damper through a mutual connection to a pulley. When the rotational brake/damper is applied or becomes effective, movement of the tension member is restricted, which also causes movement of the apparatus to be restricted. The tension member and/or pulley of this embodiment may be shared with a motor/generator, brake/damper, and/or torsional spring of the embodiment described above. The rotational brake/damper, pulley, and/or tension member of this embodiment may be combined with other embodiments.

An eighth embodiment adds a frictional brake and a tension member which is directly gripped by the frictional brake. When the frictional brake is applied, movement of the tension member is restricted, which also causes movement of the apparatus to be restricted. The tension member of this embodiment may be shared with a motor/generator and/or a rotational brake of the embodiment described above. The frictional brake and/or tension member of this embodiment may be combined with other embodiments.

A ninth embodiment coordinates movement of one or more rotational joints by means of belts, shafts, and/or flexible shafts any of which may also be combined with other embodiments.

A tenth embodiment adds a rotational actuator or motor across one or more of the individual linkage joints and can also be combined with other embodiments.

An eleventh embodiment combines and integrates the apparatus with a set of nesting shapes for use in supporting and deploying the nesting shapes. A further objective of the present embodiment is to provide a mechanism to support the nested shapes while they are retracted, extended, and in any transitional position. If fabric is used, it is also supported by the mechanism. This mechanism includes a series of linkages between successive nested shapes. In certain forms of the invention, the linkages are spring-loaded which results in two stable configurations—fully extended and fully retracted. This feature aids in keeping the apparatus in one of the two desired configurations. There are also features in the apparatus that prevent the various parts from reaching an undesired configuration, such as over-extension. An optional feature of the present embodiment provides a method of motorizing the extension and retraction. This allows for the remote extension and retraction of the apparatus for convenience.

The linkages of the eleventh embodiment are able to operate through its range of motion without operationally interfering with the nesting shapes. Furthermore, it is possible to enclose the linkage with the nesting shapes when the apparatus is fully extended. Certain variations of this embodiment may use fabric supported by the nesting shapes to form an enclosure. The fabric enclosure may enclose the linkage throughout its range of motion. It is also possible to keep the linkage from protruding past the exterior volume occupied by the nesting shapes throughout the range of motion. It is possible to integrate the nesting shapes with the linkage such that the nesting shapes become part of the linkage chain.

The eleventh embodiment is suitable for mounting on vehicles. To accommodate mounting on the rear of vehicles with rear doors, an optional feature of the eleventh embodiment is to have the overall extended shape split into two halves. These halves can be opened, providing access to the rear doors of the vehicle. This optional feature requires a support panel or framework that holds the first nested shape and any optional motorized extension and retraction mechanism. The support panel is mounted on a hinge, linkage, or linear slide. The framework can be moved away from the rear door(s) of the vehicle to allow access. Alternatively, the rear door of the vehicle itself may be incorporated in the apparatus by serving as the support panel. An alternative to having the apparatus in two halves would be to have a single whole apparatus mounted on a support panel, door, or framework that is mounted on a hinge, linkage, or linear slide. In this case, the whole apparatus would be moved away from the rear door(s) of the vehicle. For more details on this embodiment, please refer to U.S. Utility patent application—Ser. No. 11/425,854, filed Jun. 22, 2006, now U.S. Pat. No. 7,380,868. This application is hereby incorporated by reference in its entirety.

BRIEF DESCRIPTION OF THE SEVERAL VIEWS OF THE DRAWINGS

For the purposes of establishing orientation and spatial relationships, the following convention is used from FIGS. 1A through 24. The relative position of the base/mounting platform is considered down, and the direction of extension is considered up. Right, left, front, and back are taken when standing at the linkage attachment frame directly connected to the base/mounting platform and reaching towards the linkage attachment frame farthest from the base/mounting platform. The linkage set directly connected to the linkage attachment frame, which is directly connected to the base/mounting platform, is considered to be the first linkage set. The linkage set farthest removed from the base/mounting platform is considered to be the last.

When relative placements are discussed below, they are in reference to the placements in a fully extended apparatus.

Figures 6A, 6B:
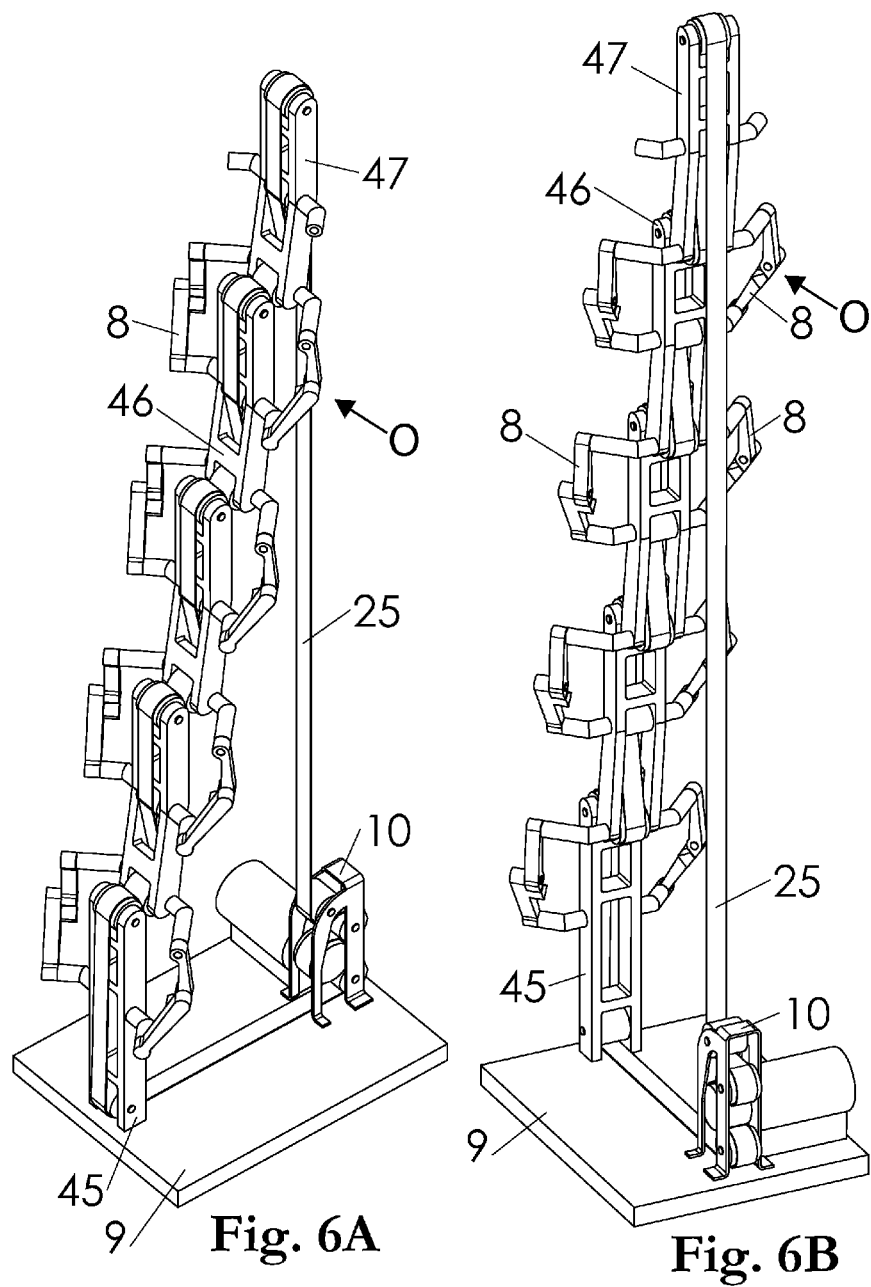

The benefits and advantages of the present invention will become more readily apparent to those of ordinary skill in the relevant art after reviewing the following detailed description and accompanying drawings, wherein:

FIGS. 1A through 1J show the apparatus as the second embodiment mentioned above. In particular:

FIGS. 1A and 1B are perspective views showing the apparatus fully extended. In particular:

FIG. 1A shows the right rear corner from above.

FIG. 1B shows the right front corner from above.

FIGS. 1C and 1D are perspective views showing the apparatus partially extended. The viewpoint of FIG. 1C matches that of FIG. 1A. Likewise, the viewpoint of FIG. 1D matches that of FIG. 1B.

FIGS. 1E and 1F are perspective views showing the apparatus fully retracted. The viewpoint of FIG. 1E matches that of FIGS. 1A and 1C. Likewise, the viewpoint of FIG. 1F matches that of FIGS. 1B and 1D.

FIGS. 1G and 1H are elevation views showing the apparatus in the same partially extended configuration. In particular:

FIG. 1G is perpendicular to the axes of rotation of the joints on the left side of the apparatus. The view is parallel to the axes of rotation of the joints on the right side of the apparatus. The view shows the left rear corner.

FIG. 1H is a view showing the right side of the apparatus.

FIG. 1I shows the back elevation of a partially extended apparatus.

FIG. 1J shows a top view of a partially extended apparatus.

FIGS. 2A through 2J show the linkage assembly (i.e., linkage unit) and components. In particular:

FIGS. 2A through 2F show the linkage assembly in different configurations, and from different viewpoints. In particular:

FIG. 2A shows a perspective view of the linkage in a fully compressed configuration (e.g., a fully folded configuration).

FIG. 2B shows the linkage in a fully open configuration (e.g., a fully unfolded configuration) where the joint is at its stops. The viewpoint matches that of FIG. 2A.

FIG. 2C shows the linkage in a fully compressed configuration (e.g., a fully folded configuration) as also shown in FIG. 2A. The view is perpendicular to the joint axes.

FIG. 2D shows the linkage in a fully open configuration (e.g., a fully unfolded configuration) as was also shown in FIG. 2B. The viewpoint matches that of FIG. 2C.

FIG. 2E shows the linkage in a partially compressed configuration (e.g., a partially folded/unfolded configuration). The viewpoint matches that of FIGS. 2C and 2D.

FIG. 2F shows the linkage in a partially compressed configuration (e.g., a partially folded/unfolded configuration) as was also shown in FIG. 2E. The viewpoint matches that of FIGS. 2A and 2B.

FIG. 2G is a perspective view showing the torsion spring component. The spring, as installed, tends to move the linkage assembly to the open configuration (e.g., the unfolded configuration) against the stops.

FIG. 2H is a perspective view of the linkage component that mounts toward the base/mounting platform.

FIG. 2I is a perspective view of the linkage component that mounts away from the base/mounting platform.

FIG. 2J is a perspective view of a linkage assembly in a partially compressed configuration (e.g., a partially folded/unfolded configuration). The linkage assembly is a mirror image of the linkage assembly shown in FIGS. 2A through 2F.

FIG. 3 is an enlarged partial view showing the apparatus in the same partially extended configuration and from the same perspective as shown in FIG. 1G. The view illustrates the linkage assembly being in the fully open configuration between apparatus segments that are fully extended and fully retracted. It also illustrates the linkage assembly in a compressed configuration between apparatus segments that are partially extended.

FIG. 4 is a perspective view from above the right rear corner showing the linkage attachment frame that connects the first set of linkage assemblies to the base/mounting platform.

FIG. 5 shows the intermediate and end linkage attachment frame. The viewpoint matches that of FIG. 4.

FIGS. 6A through 6J show the apparatus as the fifth, sixth, or seventh embodiment mentioned above. In particular:

FIGS. 6A and 6B are perspective views showing the apparatus in the fully extended configuration. The viewpoint of FIG. 6A matches that of FIG. 1A. Likewise, the viewpoint of FIG. 6B matches that of FIG. 1B.

Figures 6C, 6D:
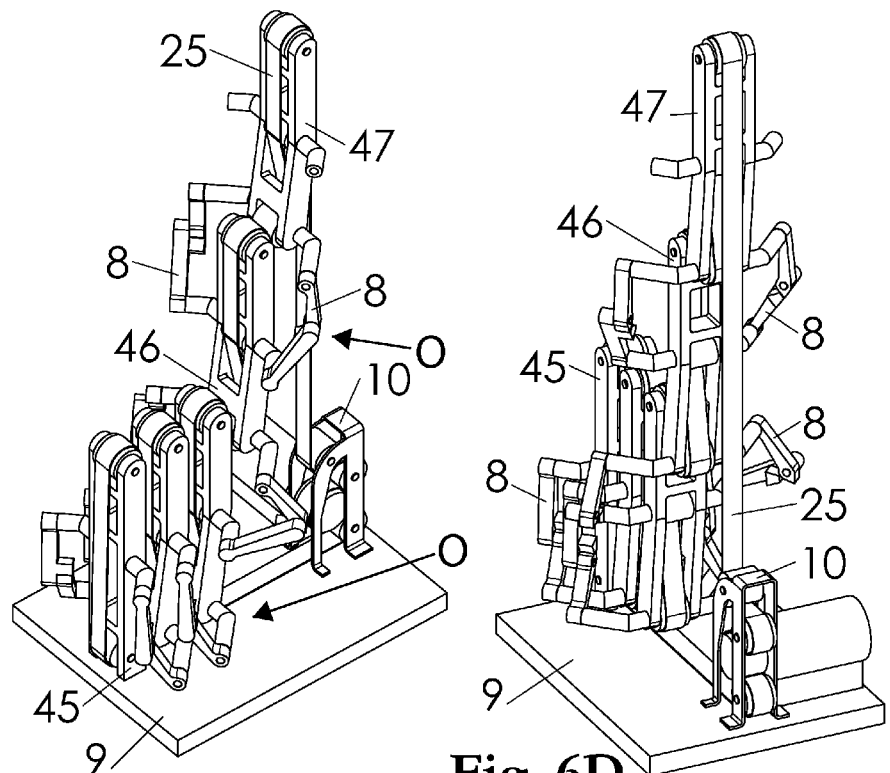

FIGS. 6C and 6D are perspective views showing the apparatus partially extended with the same linkage configuration as shown in FIGS. 1C and 1D. The viewpoint of FIG. 6C matches that of FIG. 6A. Likewise, the viewpoint of FIG. 6D matches that of FIG. 6B.

Figures 6E, 6F:
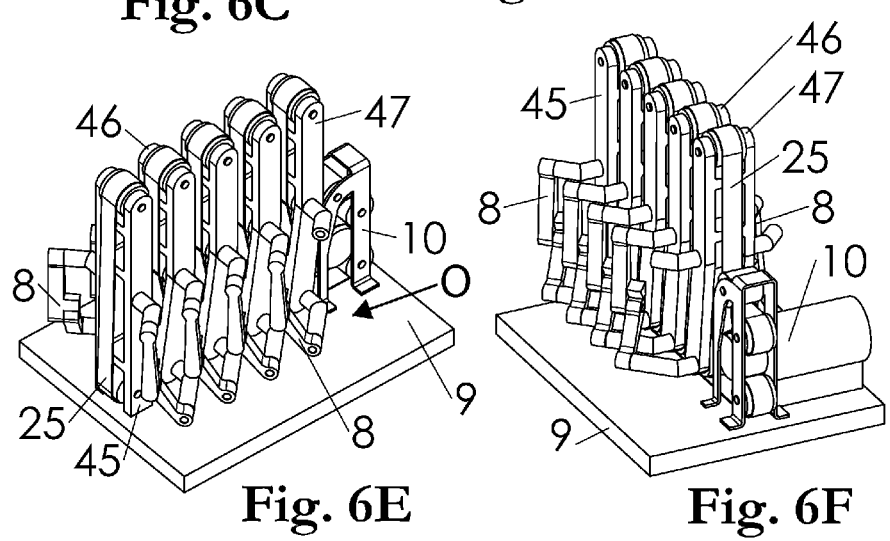

FIGS. 6E and 6F are perspective views showing the apparatus fully retracted. The viewpoint of FIG. 6E matches that of FIGS. 6A and 6C. Likewise, the viewpoint of FIG. 6F matches that of FIGS. 6B and 6D.

FIGS. 6G and 6H are elevation views showing the apparatus in the same partially extended configuration. The linkage configuration is slightly different from that shown in FIGS. 1G and 1H. In particular:

FIG. 6G has the same viewpoint as shown in FIG. 1G.

FIG. 6H has the same viewpoint as shown in FIG. 1H.

FIG. 6I shows a partially extended apparatus with the same linkage configuration and from the same viewpoint as shown in FIG. 1I.

FIG. 6J shows a top view of a partially extended apparatus with the same linkage configuration and from the same viewpoint as shown in FIG. 1J.

FIGS. 7A through 7C show the apparatus or portions of the apparatus in the same partially extended configuration. In particular:

FIG. 7A shows an elevation view of the front side.

FIG. 7B shows a cross-sectional view A-A as called out in FIG. 7A. This view illustrates how the tension member and rotational motor are able to extend and retract the apparatus.

FIG. 7C show only the tension member from the same viewpoint as FIG. 7B.

FIG. 8 shows an enlarged partial view of the tension member, the rotational motor, and the related pulleys. The viewpoint matches that of FIG. 6H.

FIG. 9 shows the linkage attachment frame that connects the first set of linkage assemblies to the base/mounting platform. The linkage attachment frame also connects to its related pulleys. The viewpoint matches that of FIG. 4.

FIG. 10 shows the intermediate linkage attachment frame. The linkage attachment frame also connects to its related pulleys. The same frame is used as the last pulley and linkage attachment frame. The viewpoint matches that of FIG. 9.

FIGS. 11A through 11G show the apparatus or portions of the apparatus as the fifth, sixth, or seventh embodiment mentioned above. In this version, an additional set of linkage assemblies and attachment points are added to the version immediately above. These linkage assemblies are paired on each side and in each segment with the existing linkage assemblies. In particular:

FIGS. 11A through 11C all have the same viewpoint as FIGS. 6A, 6C, and 6E. In particular:

FIG. 11A shows the apparatus fully extended.

FIG. 11B shows the apparatus partially extended with the same linkage assembly configuration as shown in FIG. 6C. As mentioned above, a set of linkage assemblies has been added, thus doubling their quantity.

FIG. 11C shows the apparatus fully retracted.

Figures 11D, 11E, 11F:
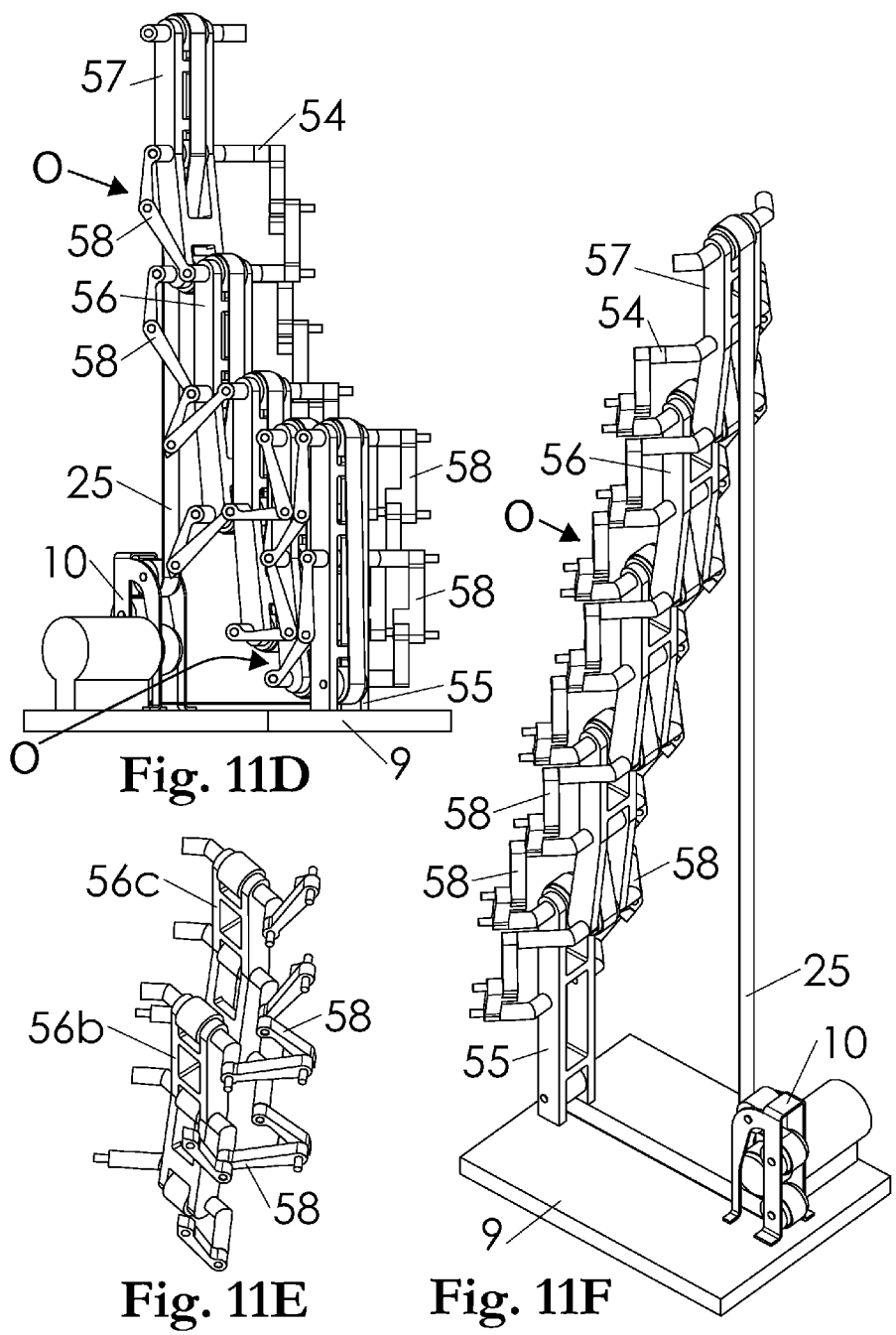

FIG. 11D shows the apparatus partially extended with the same linkage configuration shown in FIG. 1G. The viewpoint matches that of FIGS. 1G and 6G.

FIG. 11E shows a perspective view of a typical apparatus segment. The linkage assemblies on the right hand side are shown. Those on the left hand side have been removed. The linkage components extending to the apparatus segments before and after the current segment are also shown on the right hand side only. This view illustrates the apparatus linkage connection chain.

FIG. 11F shows a perspective view from above the right front corner with the apparatus fully extended.

Figure 11G:
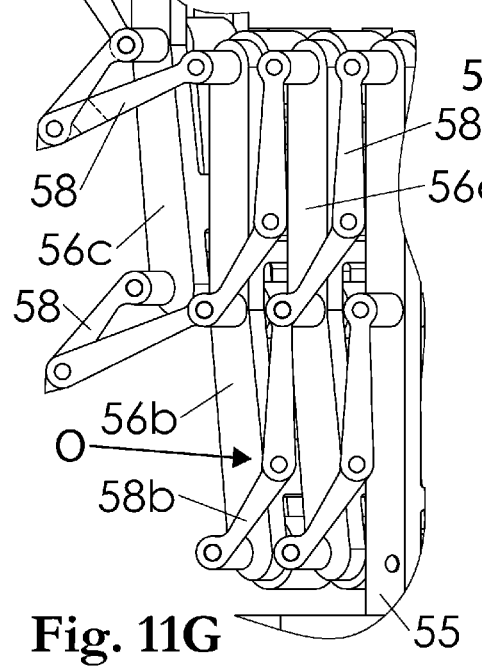

FIG. 11G is an enlarged partial view showing a partially extended apparatus with the same linkage configuration as shown in FIG. 6G. The viewpoint matches FIGS. 6G and 11D.

Figure 12:
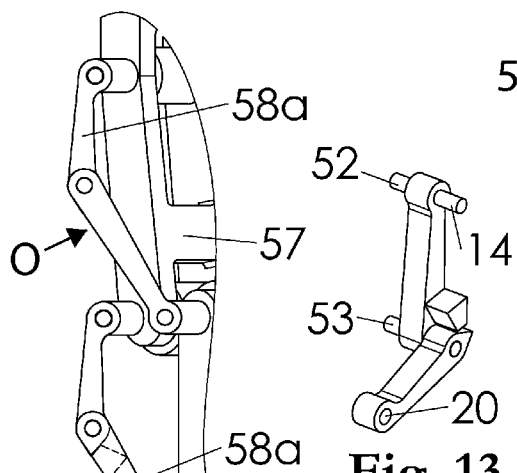

FIG. 12 is a perspective view of a linkage connection extender used between the last linkage attachment frame and the higher linkage assemblies.

Figures 13, 14:
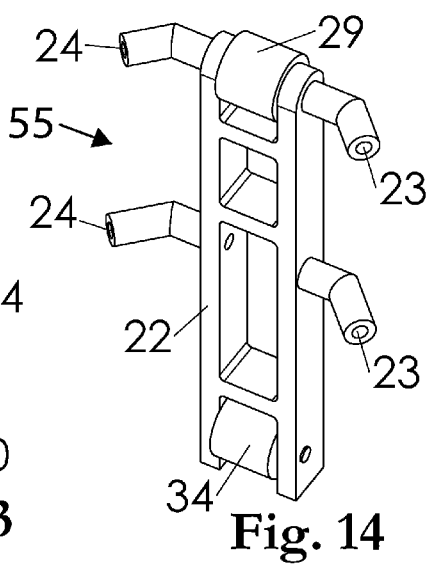

FIG. 13 is a perspective view of a linkage assembly similar to that shown in FIG. 2J but with added attachment points.

FIG. 14 shows the linkage attachment frame (e.g., linkage interconnect member) that connects the first set of linkage assemblies to the base/mounting platform. The frame is similar to that shown in FIG. 9 but with added attachment points. The viewpoint matches that of FIGS. 4 and 9.

Figure 15:
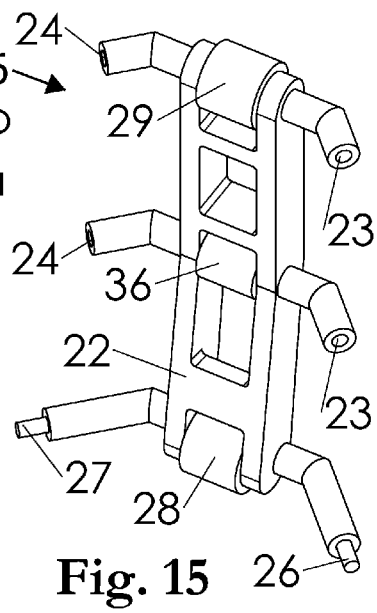

FIG. 15 shows the intermediate linkage attachment frame (e.g., linkage interconnect member). The same frame is used as the last linkage attachment frame. The frame is similar to that shown in FIG. 10 but with added attachment points. The viewpoint matches that of FIG. 14.

FIGS. 16A through 16D and 17 show the apparatus or portions of the apparatus as the fifth, sixth, or seventh embodiment mentioned above. In this version, a connection link is added to the version immediately above. The link is added between the paired upper and lower linkage assemblies on the same side and in the same apparatus segment. In particular:

FIG. 16A shows the apparatus partially extended with the same linkage configuration shown in FIGS. 1G and 11D. The viewpoint matches that of FIGS. 1G, 6G, and 11D.

FIG. 16B shows the same components in the same configuration from the same viewpoint as are shown in FIG. 11E with the addition of the connection link.

FIG. 16C shows the apparatus in the same fully extended configuration and from the same viewpoint as FIG. 11A. The only change is the addition of the connection link.

FIG. 16D shows the apparatus in the same partially extended configuration and from the same viewpoint as FIG. 11G. The only change is the addition of the connection link.

FIG. 17 is a partial perspective view from the right rear corner showing a pair of linkage assemblies connected by a connection link.

FIG. 18 is a perspective view from the left front corner showing a connection link.

FIGS. 19A, 19B, 20A and 20B are perspective views showing the apparatus as the eleventh embodiment mentioned above. In this embodiment, two or more combined linkage assemblies are used. In particular:

FIGS. 19A and 19B show the apparatus with four combined linkage assemblies that are held together by hoop shaped frames. Each hoop shaped frame connects to each respective linkage attachment frame at the same level in the apparatus. In particular:

FIG. 19A shows the apparatus fully extended.

FIG. 19B shows the apparatus fully retracted.

FIGS. 20A and 20B show an apparatus similar to that shown in FIGS. 19A and 19B. In this version, three combined linkage assemblies are used instead of four.

Figures 21A, 21B, 21C:
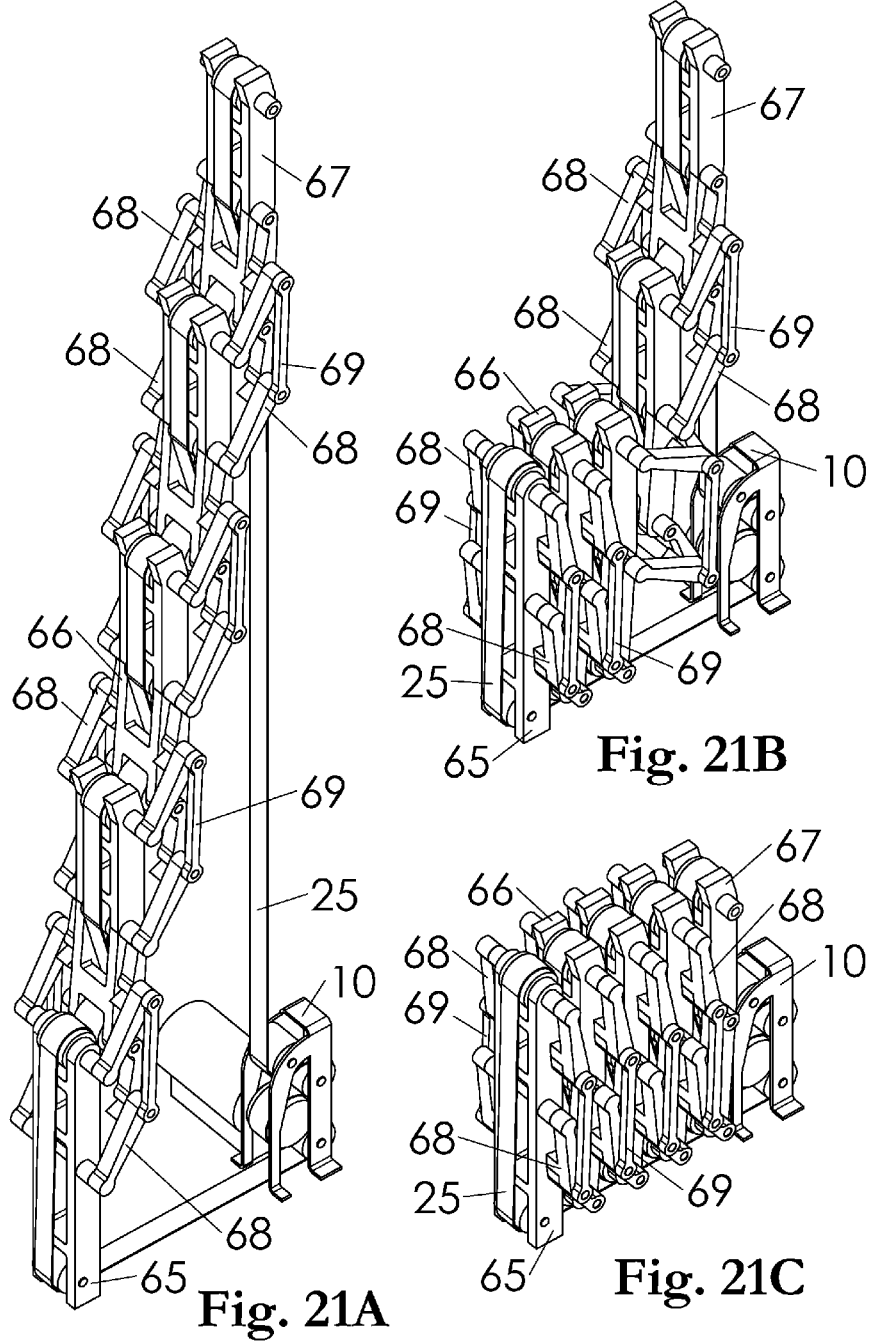

FIGS. 21A through 21C are perspective views showing the combined linkage assembly from above the right rear corner. In the version shown here, two or more combined linkage assemblies are used together. In particular:

FIG. 21A shows the combined linkage assembly fully extended.

FIG. 21B shows the combined linkage assembly partially extended.

FIG. 21C shows the combined linkage assembly fully retracted.

FIG. 21D is an enlarged partial left elevation view of the combined linkage assembly FIG. 22 is a perspective view of a linkage assembly in the apparatus. This view illustrates that a linkage assembly may have multiple parallel links.

FIG. 23 is a perspective view of a linkage attachment frame that is used with the combined linkage assembly illustrated in FIGS. 21A through 21D.

FIG. 24 is a perspective view of a connection link that is used with the combined linkage assembly illustrated in FIGS. 21A through 21D.

Figure 25A:
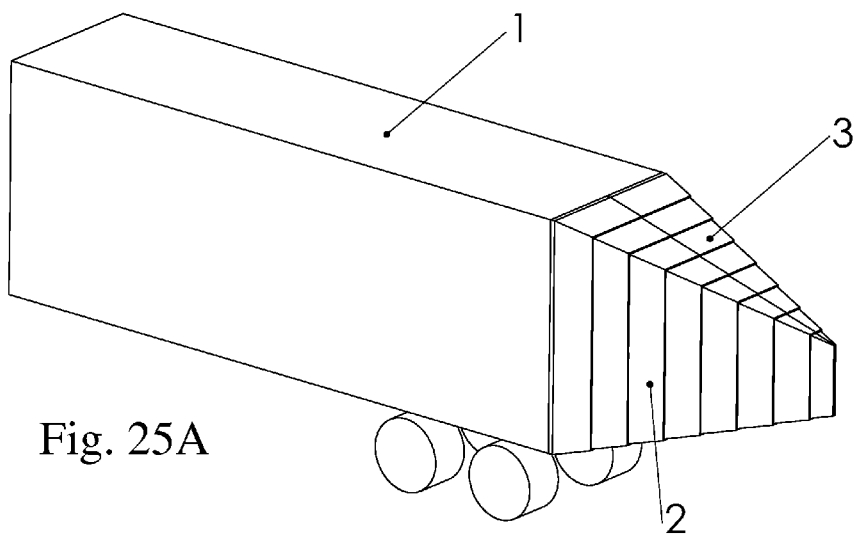

FIGS. 25A through 25D show the apparatus as a version of the eleventh embodiment mentioned above, including panel assemblies and linkage assemblies, mounted on the rear of an over-the-road trailer in various configurations. In this version, two apparatuses form two halves, right and left. The right and left halves are opened for access to the rear of the trailer. In particular:

FIG. 25A is a perspective view from the left rear corner. The configuration shown is fully extended with trailer doors closed.

Figure 25B:
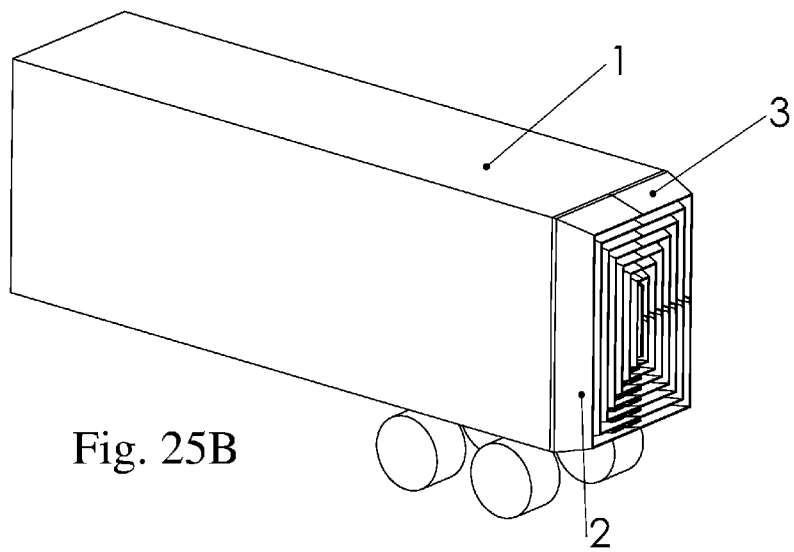

FIG. 25B is a perspective view from the left rear corner. The configuration shown is fully retracted with trailer doors closed.

Figure 25C:
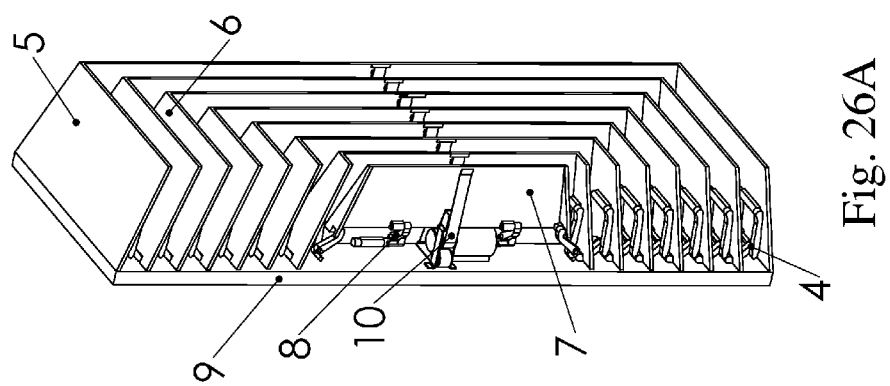

FIG. 25C is a partial perspective view from the left rear corner. The configuration shown is fully retracted on the left half and fully extended on the right with both trailer doors opened.

FIG. 25D is a partial perspective view from the left rear corner. The configuration shown has both halves partially extended with the right trailer door closed and the left trailer door open.

Figure 26A:
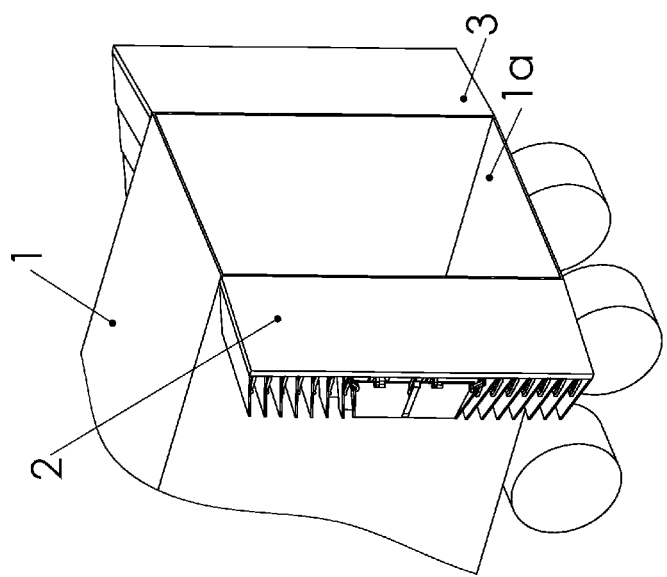

FIGS. 26A through 26C show perspective views of the right apparatus of FIGS. 25A through 25D in various configurations. In particular:

FIG. 26A is a perspective view showing the right apparatus fully retracted.

FIG. 26B is a perspective view showing the right apparatus partially extended.

FIG. 26C is a perspective view showing the right apparatus fully extended.

FIGS. 27A through 27C show a version of the linkage assembly of FIGS. 25A through 25D. The linkage assemblies are used to hold the panel assemblies in place. In particular:

FIG. 27A is a perspective view showing the linkage assembly in its fully extended position.

FIG. 27B is a second perspective view showing the linkage assembly in its fully extended position.

FIG. 27C is a cross section of the linkage assembly showing the linkage assembly fully extended. The section cut is perpendicular to the linkage rotation axis.

FIGS. 28A through 28D show several variations of the panel assemblies of FIGS. 25A through 25D. Each of the panel assemblies has provisions to mount several of the extension-retraction linkages (linkage assemblies) of FIGS. 27A through 27C. These panels, in fact, become part of a linkage chain in the overall apparatus. In the form shown in these figures, the panel assemblies each have provisions to guide an extension-retraction web. The web exerts forces on the guides that cause the apparatus to extend and retract. In particular:

FIG. 28A is a perspective view showing a typical panel assembly representative of other panel assemblies with the exception of the farthest upstream and farthest downstream panel assemblies. These panel assemblies have provisions to rotatably mount two sets of linkage assemblies. The first set is mounted toward the upstream edge of the panel assembly and is used to hold the linkage assembly that is also connected to the panel assembly immediately upstream. The second set is mounted in the interior of the panel assembly and is used to hold the linkage assembly that is also connected to the panel assembly immediately downstream. In this particular view, the two sets of mounts are at the same elevation. In the version shown, the panel assembly has notches to allow the upstream linkage assemblies to swing through their required range of motion. The notches, as shown here, are not visible from the exterior of the apparatus when it is fully deployed.

FIG. 28B is a perspective view showing a variation of the typical panel assembly discussed in the preceding paragraph. The variation illustrated locates the upstream and downstream linkage mounts at different rather than the same elevation.

FIG. 28C is a perspective view showing the panel assembly farthest downstream. It has provisions to rotatably mount several linkage assemblies. Each of these linkage assemblies also attach to the panel assembly immediately upstream. In the form shown, this panel has an extension-retraction, web-guiding feature in addition to two web mounting features. The first web-mounting feature holds the end of the web closest to the web guiding features in the panel assemblies. The second web-mounting feature holds the end of the web closest to the extension-retraction actuation motor. In the form shown, this panel assembly has notches to allow the linkage assemblies to swing through their required range of motion.

FIG. 28D is an enlarged partial perspective view of a typical panel assembly showing the pivoting linkage mounting surfaces and notches mentioned above.

FIGS. 29A and 29B show the extension-retraction web, its routing, related hardware, and attachment points. In particular:

FIG. 29A is a section view of the right apparatus of FIGS. 25A through 25D in a partially extended configuration with various configurations of link assemblies, an extension-retraction web routing, web attachment points, and web pulleys. It also shows a linkage extending past the usual boundary of the apparatus half. The section cut is through the vertical center of a typical apparatus.

FIG. 29B is a reduced scale version of FIG. 29A showing only the web and the centers of the web pulleys and centers of the panel web guides. The section cut is through the vertical center of a typical apparatus.

FIG. 30 is a partial section view showing two linkage assemblies from end to end. The first linkage assembly is between a fully retracted pair of panel assemblies. The second linkage assembly is between a fully extended pair of panel assemblies. In both cases, the linkage assemblies themselves are fully extended (e.g., fully unfolded). Since the linkage assemblies are spring-loaded to seek this fully extended configuration (e.g., fully unfolded configuration), the apparatus will seek either the extended or retracted configurations between each set of neighboring panels. The linkage assemblies also form a mechanical stop to keep the apparatus from over extending or over retracting, holding each pair of neighboring panels either in the extended or retracted position. This is very desirable since those two configurations are sought in operation, and movement drifting toward an intermediate position would either lose aerodynamic performance, if drifting from the extended configuration, or occupy more volume, if drifting from the retracted position. The view's section cut is taken through the linkage component that attaches to the upstream edge of the panel assemblies and is perpendicular to the pivot point within the linkage assembly.

Figure 31:
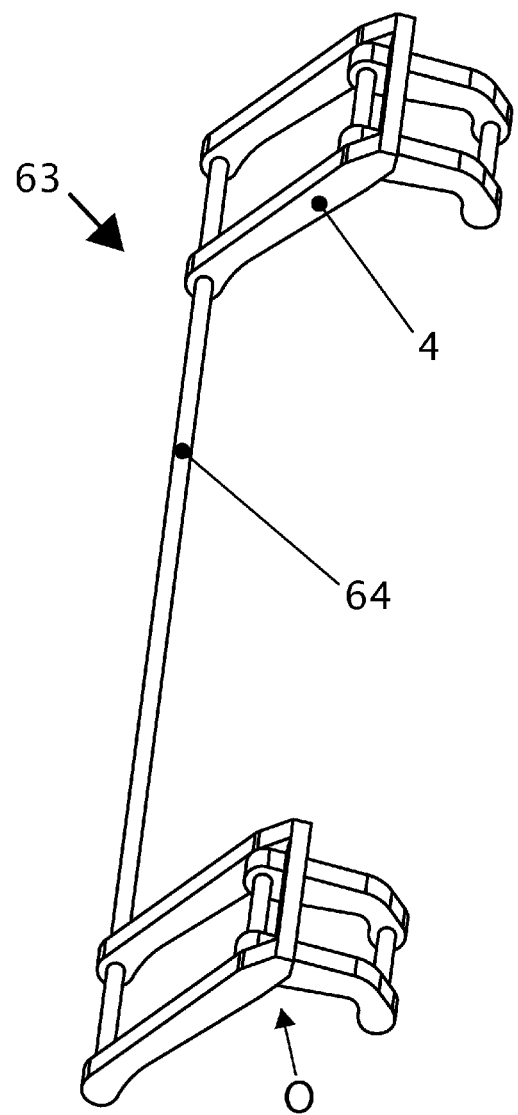

FIG. 31 is a perspective view of two extension-retraction linkage assemblies (i.e., linkage units) with a straight shaft connection joining a corresponding pair of links together. This ensures coordinated, non-binding action in certain forms of the apparatus, especially where the spacing between linkage assemblies is wide. The straight shaft connection shown in this view could be replaced with a flexible shaft connection in the case that the coordinated links do not share a common pivot centerline. A gear train connection including components such as U-joints, belts, pulleys, and bevel gears could also replace the straight shaft connection. This view shows two linkage assemblies being connected and therefore coordinated. Additional linkage assemblies could be added in series or in parallel. In this view, linkage assemblies from between the same panel assemblies are connected. Linkage assemblies that are not between the same panel assemblies could also be connected in series or in parallel. An actuator controlling multiple linkage assemblies could be added to the shaft or alternate connecting parts mentioned above.

Figure 32A:
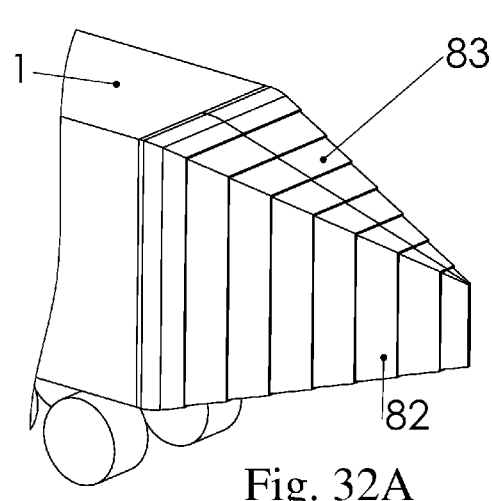
Figure 32B:
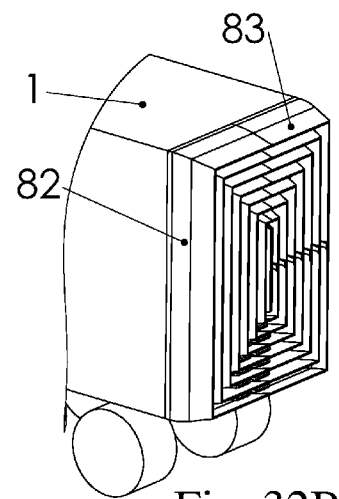
Figure 32C:
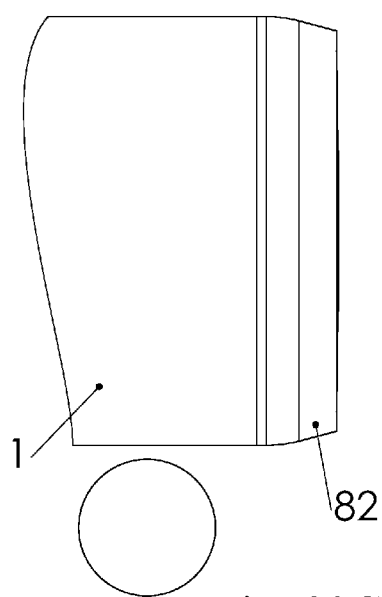

FIGS. 32A through 32F show the apparatus as another version of the eleventh embodiment mentioned above, including panel assemblies and linkage assemblies, mounted on the rear of an over-the-road trailer in various configurations. In this version, two apparatuses form two halves, right and left. The right and left halves are opened for access to the rear of the trailer. The present variation incorporates a smooth transition across the apparatus and the vehicle or trailer. The smooth transition, as shown in these figures, is formed into the panel assembly farthest upstream. The components and their functions are similar or identical to the version shown in FIGS. 25A through 25D. In particular:

FIGS. 32A through 32C show the present variation mounted on the rear of an over-the-road trailer in two configurations. In particular:

FIG. 32A is a partial perspective view from the left rear corner. The configuration shown is fully extended with trailer doors closed.

FIG. 32B is a partial perspective view from the left rear corner. The configuration shown is fully retracted with trailer doors closed.

FIG. 32C is a partial side elevation view from the left. The configuration shown is fully retracted with trailer doors closed and illustrates the smooth transition across the trailer and apparatus.

Figure 32D:
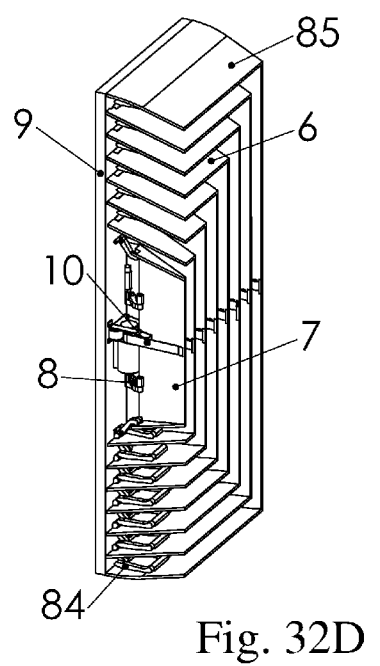

FIG. 32D is a perspective view showing the right apparatus fully retracted. It is similar to FIG. 26A with the exception of the panel assembly farthest upstream. This panel assembly has curved surfaces that are tangent to their corresponding exterior trailer surfaces.

Figure 32E:
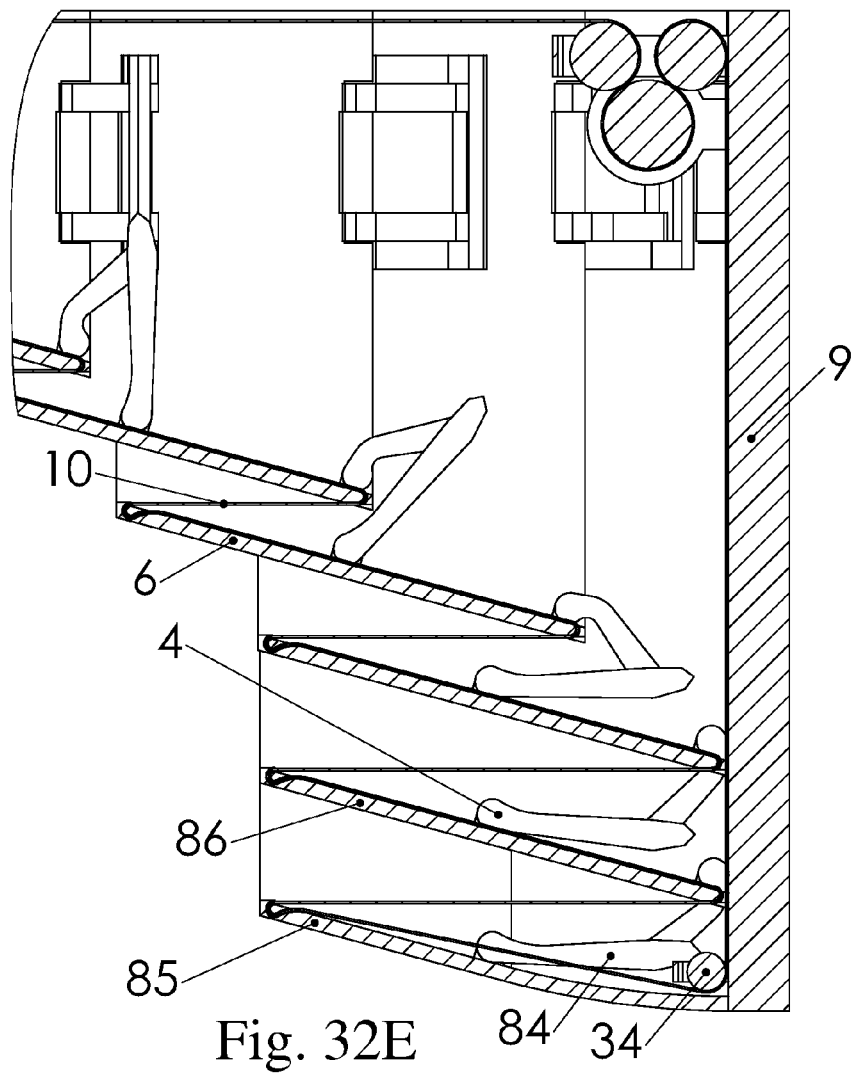

FIG. 32E is a partial section view of a partially extended apparatus. It is similar to FIG. 29A with the exception of the panel assembly farthest upstream, a special set of more compact extension-retraction linkage assemblies, a slightly different web corner pulley location, and a slightly different apparatus extension configuration. The linkage assemblies between the panel assembly farthest upstream and the adjacent panel assembly are specially designed to fit into the more compact space available when this form of the apparatus is in the retracted configuration. The section cut is through the vertical center of the apparatus.

FIG. 32F is an enlarged partial section view of a partially extended apparatus. It is similar to FIG. 32E with the exception of a different apparatus extension configuration and larger scale. The more compact linkage assembly mentioned above is shown at its closest point to the farthest upstream panel assembly. This view also illustrates the extension-retraction web routing between panel assemblies. If the web were drawn tighter in the areas shown in this view, the upstream edge of the downstream panel assemblies would be drawn towards the adjacent downstream edge of the upstream panel assemblies. This would have the cumulative effect of extending the apparatus. The section cut is through the vertical center of the apparatus.

FIGS. 33A through 33E show a form of the apparatus as yet another version of the eleventh embodiment mentioned above. The present version substitutes hinged panels for the linkage assemblies such as those shown in FIGS. 27A and 27B. As compared to the previous versions of the eleventh embodiment, the notches on the leading edge of the panel assemblies have been removed. Instead of the notches, the entire upstream edge of the panel assembly has been trimmed, allowing the hinged panels connecting to the upstream panel assembly to occupy a space in front of the upstream edge. In comparison, this reduces the overlap from one panel assembly to the next when fully deployed. The hinged panel assemblies are used on the top, bottom, right, and left sides. The five figures are all partial elevation views showing the interior of the left hand apparatus. The figures all show the highest hinged panel assembly in the fully retracted configuration and the lowest hinged panel assembly in the fully extended configuration. As with the linkage assemblies, the hinged panel assemblies could use springs and hinge stops to keep the apparatus stable in the fully extended and fully retracted positions. This form of the invention will allow a similar web extension-retraction system, providing the hinged panels assemblies are interrupted to allow the web to pass through. The term "hinged panels" is used for descriptive purposes. In fact, the "hinged panels" are linkage assemblies (i.e., linkage units) in their own right. The hinged panels could range in length from rather short to close to the length of the corresponding panel assembly. The minimum workable length for each successive group of hinged panels is determined by strength considerations. The maximum workable length is determined by the need to avoid interference with the panel assemblies in all configurations. In particular:

FIG. 33A shows the center hinged panel assembly in the fully retracted configuration.

FIG. 33B shows the center hinged panel assembly in the slightly extended configuration.

FIG. 33C shows the center hinged panel assembly extended farther than in FIG. 33B.

Figure 33D:
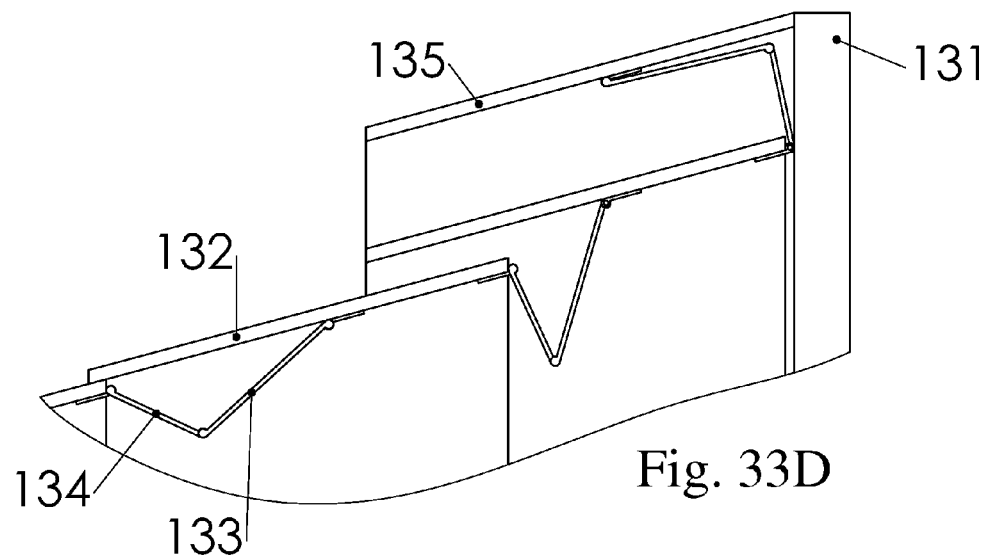

FIG. 33D shows the center hinged panel assembly extended farther than in FIG. 33C.

Figure 33E:
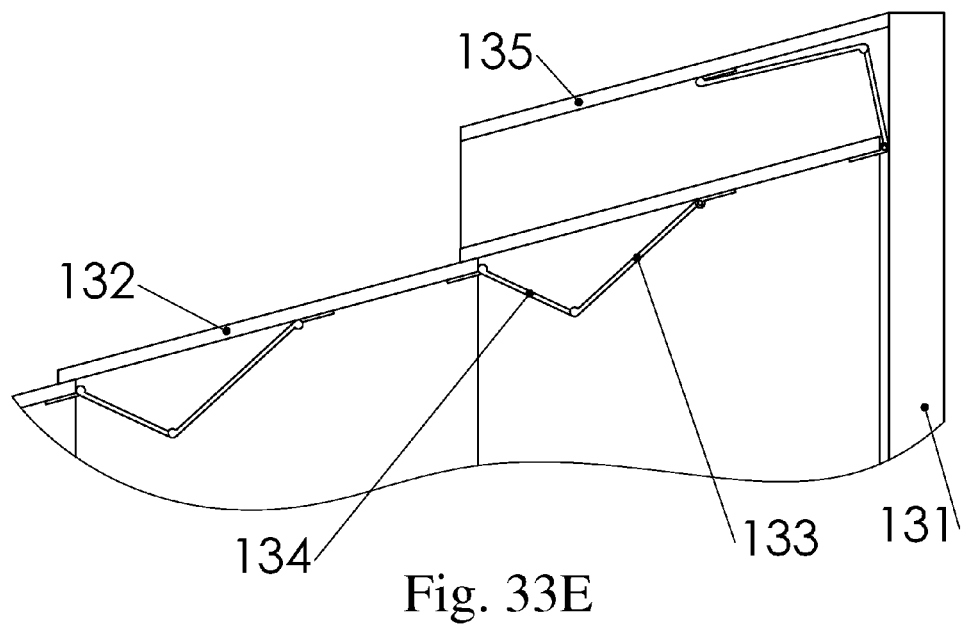

FIG. 33E shows the center hinged panel assembly fully extended configuration.

DETAILED DESCRIPTION OF THE INVENTION

As mentioned above, this disclosure claims the benefit of U.S. Provisional Patent Application Ser. No. 60/822,058, filed Aug. 10, 2006, which application is hereby incorporated by reference in its entirety.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

The embodiments presented are also shown in various forms and shapes and with various optional features in various combinations. These variations also are exemplifications of the invention and are not intended to limit the combinations of forms, shapes, and optional features.

It should be further understood that the title of this section of this specification, namely, "Detailed Description of the Invention", relates to a requirement of the United States Patent Office, and does not imply, nor should be inferred to limit the subject matter disclosed herein.

Referring now to the figures, in particular to FIGS. 1A through 1J, there is shown an exemplary apparatus, classified above as the second embodiment, which includes a base/mounting platform 9 fixedly connected to a first linkage attachment frame 5 (e.g., an interconnect member). Rotatably connected to the first linkage attachment frame 5 are two linkage assemblies 8 (i.e., linkage units). The rotation axes of these joints are at the same elevation and they are non-parallel. The opposite end of the two linkage assemblies 8 are rotatably connected to an intermediate linkage attachment frame 6 (e.g., an interconnect member). The rotation axes of these joints are also at the same elevation with each other and they are non-parallel with each other. The opposite end of the intermediate linkage attachment frame 6 is rotatably connected to a second pair of linkage assemblies 8 repeating a pattern started at the first linkage attachment frame 5. This pattern can continue indefinitely. In FIGS. 1A through 1J, there are, in total, four sets of linkage assemblies 8 connected to three intermediate linkage attachment frames 6, with one set of linkage assemblies 8 at each end. The last linkage attachment frame 7 is rotatably connected to the last set of linkage assemblies 8. Each pair of rotation axes of these joints is also at the same elevation with each other, and they are also non-parallel with each other.

The combination of linkage attachment frames 5, 6, and 7 and linkage assemblies 8 forms a combined linkage assembly 73. These parts form an extended linkage chain. A segment of the linkage chain is defined as the related set of linkage assemblies 8 and the two linkage attachment frames 5, 6, or 7 that connect on either end of the set. Each linkage attachment frame 6 is both the end of one segment and the beginning of the next. On the near end of each segment (connected closest to the base/mounting platform 9), two rotational joints are formed. The first is by feature 14, illustrated in FIG. 2H, of one linkage assembly 8 (i.e., linkage unit) and feature 23, illustrated in FIGS. 4 and 5, of the linkage attachment frame 5 or 6. The second is by feature 14 of another linkage assembly 8 (i.e., linkage unit) and feature 24, illustrated in FIGS. 4 and 5, of the linkage attachment frame 5 or 6. On the far end of each segment (connected farthest from the base/mounting platform 9), two rotational joints are also formed. The first is by feature 20, illustrated in FIG. 2I, of one linkage assembly 8 (i.e., linkage unit) and feature 26, illustrated in FIG. 5, of the linkage attachment frame 6 or 7. The second is by feature 20 of the other linkage assembly 8 (i.e., linkage unit) and feature 27, illustrated in FIG. 5, of the linkage attachment frame 6 or 7. Four examples of linkage chain segments are illustrated both in FIGS. 1G and 1H. They are, individually, the pair of linkage assemblies 8, 8a, or 8b (i.e., linkage units) between and including linkage attachment frames 5 and 6a, 6a and 6b, 6b and 6c, and 6c and 7.

A version of the apparatus may be formed with only one segment. In this case, no linkage attachment frame 6 is used. The linkage assemblies 8 connect on one end to linkage attachment frame 5 and on the other to linkage attachment frame 7 e.g., an interconnect member.

The linkage attachment frame 5 is further illustrated in FIG. 4 wherein the rotational features 23 and 24 are held to each other and to the base/mounting platform 9 connection by a framework 22.

The linkage attachment frame 6 is further illustrated in FIG. 5 wherein the rotational features 23, 24, 26, and 27 are held to each other by a connection framework 22. External attachment points may be optionally added to any or all frameworks 22.

The features required of linkage attachment frame 7 can be fulfilled by linkage attachment frame 6 with rotational features 23 and 24 being optionally deleted or converted into external attachment points.

The linkage assembly 8 is further illustrated in FIGS. 2A through 2F and 2J. It is comprised of a link 11 that is connected to the near end of the linkage chain segment and a link 12 that is connected to the far end of the linkage chain segment. The links 11 and 12 are rotatably connected to each other by their respective rotational features 16 and 18 forming a joint. The various features of link 11 are held in place by one or more link arms 15. The various features of link 12 are held together by one or more link arms 19.

FIGS. 2A through 2F and 2J also illustrate an optional torsional spring 13 operating between the links 11 and 12 of the linkage assembly 8. The function of the spring 13 is to apply an opening torque (e.g., an unfolding torque) to the linkage assembly 8. If able to overcome friction and external loads, the spring 13 will open (e.g., unfold) the linkage assembly 8 until its extension limiting stops 17 and 21 (called out in FIGS. 2H and 2I) contact each other as shown in FIGS. 2B and 2D. This movement will also cause the rotational surfaces 14 and 20 at the end of the linkage assembly 8 to extend away from each other. When fully open (e.g., fully unfolded), the extension limiting stops 17 and 21 may preload the spring.

A primary benefit provided by the torsional spring 13 in the preceding paragraph is a discrete number of stable positions along the range of motion of the combined linkage assembly 73 including the fully extended and fully retracted positions. This behavior is caused within each linkage chain segment when each linkage assembly 8 is spring loaded against its stops 17 and 21. The linkage assembly 8 is in this fully open position O (e.g., this fully unfolded orientation), as shown in FIGS. 2B and 2D, when the segment is either fully retracted or fully extended. This gives each segment only two stable positions—fully extended and fully retracted. If the segment is put in another position and released, the torsional spring 13 will return the segment to one of the two stable positions. This feature allows the apparatus to be set in the fully extended or fully retracted configurations and keep the set position until a different configuration is desired. Likewise, it also allows any discrete configuration to be set and held, provided that each segment within the configuration is either fully extended or fully retracted.

The bi-stable nature of each linkage chain segment as described in the preceding paragraph is illustrated in FIG. 3. In addition, the illustrated travel stops are effective in preventing over extension and over retraction. In particular, the linkage chain segment defined between linkage attachment frames 6a and 6b is fully retracted and the segment defined between frames 6c and 7 is fully extended. In both cases, the linkage assemblies 8a and 8b are fully open (e.g., fully unfolded), the extension limiting stops 17 and 21 are engaged, and the segment is in a stable configuration. In contrast, the former can extend but not retract and the latter can retract but not extend. The segment defined between frames 6b and 6c is partially extended, the stops 17 and 21 of the linkage assembly 8 are not engaged, and the segment is not in a stable configuration. This segment is free to either retract or extend under an external load. Absent external influences, the torsional spring will cause the segment to either fully extend or fully retract.

If the spring 13 were deleted from these figures, the most basic form of the invention, classified above as the first embodiment, would be created. This embodiment provides a linear or curvilinear path across each linkage chain segment. A travel limit function across each linkage chain segment is also provided by the extension limiting stops 17 and 21 as discussed in the preceding paragraph.

If the joints of a linkage assembly 8 with associated rotational surfaces 14, 16, 18, and 20 are parallel with each other and allow only rotation, a single linkage assembly 8 will constrain the movement across its segment of the linkage chain to a plane perpendicular to its axes of rotation. A second similar linkage assembly 8 within the same segment, whose joints with rotational surfaces 14, 16, 18, and 20 are parallel to themselves but not parallel with the joints of the first, will likewise define a second planar constraint across the same segment of the linkage chain. Operating together, these two planar constraints will combine to form a linear constraint across the segment along the intersection of the two planes.

Classified as the fourth embodiment above, if one or both of the linkage assemblies 8 of the preceding paragraph has one or more of its axially constrained joints replaced with a joint combining linear and rotational movement, a curvilinear constraint will result. The first linkage assembly 8 will constrain the movement across the segment to a surface. Likewise, the second linkage assembly 8, whose rotational surfaces are non-parallel with the first linkage assembly 8, will constrain the movement across the segment to a second surface. Operating together, these two surface constraints will combine to form a curvilinear constraint across the segment at the intersection of the two surfaces. This curvilinear motion may be required by a specific application. It may also be used to give the apparatus various stable configurations along its range of motion. In addition, the joint kinematics along with a load at the joint may be used to bias the movement. The load at the joint may be provided by various means such as gravity or a spring.

If one or more of the joints of one of more of the linkage assemblies 8 contain significant friction or have a damper placed across them, the third embodiment mentioned above is created.

If one or more of the joints of one or more of the linkage assemblies 8 have an actuator or motor placed across them, the tenth embodiment mentioned above is created.

If the movement between two or more of the joints of two or more of the linkage assemblies 8 are mechanically coordinated, the ninth embodiment mentioned above is created. Components such as belts, pulleys, gears, shafts, flexible shafts, and the like can be used to mechanically coordinate one or more of the joint movements. An example of this arrangement is shown in FIG. 31 where linkage assembly 63 includes two linkage assemblies 4 in combination with a straight shaft connection 64 between them. This is useful to coordinate the motion of one or more linkage assemblies 4 that are separated by a distance. This form of linkage assembly 63 may also be employed on other forms of the invention between two or more linkage assemblies 4 or 8 (i.e., linkage units) that have collinear joints axes. A flexible shaft connection could be used in forms of the invention that have non-collinear joints. A gear train connection could also be used to coordinate movement between various linkage assemblies. The linkage assemblies could be between the same or different sets of panels. An actuator could power one or more of these connected linkage assemblies.

In the preceding paragraphs, the linkage assembly's 8 joint axes are defined to be parallel. Other embodiments, not classified above, are possible if one or more of the joint axes are not parallel. In this case, special design consideration will be required prevent the linkage chain from locking up kinematically. This could be resolved, for example, by using one or more deformable links.

A linkage assembly 8 with significantly deformable links 11 and 12 and linkage attachment frames 5, 6, and 7 may be used to provide various benefits. These include but are not limited to a bi-stable linkage chain segment with the benefits mentioned above, impact and shock absorption, and providing desired flexibility and compliance in the structure.

Rotating joints are mentioned extensively above that pertain to the linkage joints. It is recognized that in certain applications the rotating joints may be substituted by components with similar properties. These include, but are not limited to, plastic hinges, deformable leaf springs, ball joints, ball joints in combination with a sliding joint, and cable.

A method of actively controlling the apparatus will now be described. In particular, the method employs a web, chain, rope or other flexible element 25 and is illustrated in FIGS. 6A through 6J, 7A through 7C, 8, 9, and 10. This optional feature allows remote, powered extension and retraction of the apparatus. To operate the extension-retraction system 10, a drive motor 32 rotates a connected drive pulley 33, which moves a flexible element 25 in one direction when turning clockwise and the opposite direction when turning counter-clockwise. In turn, the flexible element 25 causes the apparatus to extend when moved in one direction and retract when moved in the other. Beyond the extension-retraction system 10, other additions and modifications to the components described above are needed. The linkage attachment frames 5 and 6 require added pulleys 28, 29, 34 and 36 as shown in FIGS. 9 and 10 held by a connection framework 22. The connection framework 22 is longer than the previous version. Because of these changes and additions, the former linkage attachment frames 5, 6, and 7 in their current form are numbered 45, 46, and 47 respectively. Discussions above that considered order dependency for the linkage attachment frames 6a, 6b, and 6c also hold for their current versions 46*a*, 46*b*, and 46*c* respectively. The function of the linkage assemblies 8 remains unchanged. The addition of the motorized extension-retraction capability was classified above as the fifth embodiment.

In an example embodiment shown in FIG. 8, the flexible element 25 is kept under tension by a pair of tensioning pulleys 35 which also serve to keep most of the drive pulley 33 in contact with the flexible element 25. Guiding pulleys 34 are also employed, where needed, to provide a convenient path for the flexible element 25.

The flexible element 25 is attached to the last linkage attachment frame 47. This attachment can be made in a variety of ways. In example embodiments, there are two separate or one shared connections made between points 30 and 31 on the flexible element 25 that connects the linkage attachment frame 47 to the flexible element 25. FIGS. 7B and 7C illustrate the case of one common connection point. In this case, the flexible element 25 forms a continuous loop as shown in FIG. 7C. In the case of two separate attachment points, a length of the flexible element 25 is removed along the shorter distance between points 30 and 31. Each end of the remaining length of flexible element 25 is attached to linkage attachment frame 47 between points 30 and 31. Pulleys 28, 29, and 36 may optionally be mounted on the last linkage attachment frame 47. If these pulleys 28, 29, and 36 are used, they will not rotate in normal operation. One or more of these fixed pulleys 28, 29, or 36 may serve as the flexible element 25 attachment point. As illustrated at FIG. 7B, a first variable length portion $25_1$ of the flexible element 25 is formed between the fixed pulley 29 and the upper guide pulley 34. The first variable length portion $25_1$ of the flexible element 25 extends parallel to a linear path P. The linkage attachment frame 47 moves along the generally linear path P as the linkage arrangement is moved from the retracted orientation to the extended orientation.

The operation of the extension-retraction system 10 is described below. If retraction is desired, the drive motor 32 is made to turn counter-clockwise as shown in FIG. 8. This causes a tension increase in the section of the flexible element 25 between the drive motor pulley 33 and the flexible element 25 connection point nearest point 31 shown in FIG. 7B including the first variable length portion $25_1$ of the flexible element 25. This section of the flexible element 25 under increased tension does not wind through linkage attachment frames 45 or 46. The increase in tension pulls the last linkage attachment frame 47 towards the base/mounting platform 9 thereby shortening the first variable length portion $25_1$ of the flexible element 25. Since the linkage attachment frames 45, 46, and 47 and linkage assemblies 8 are connected in series; the entire combined linkage assembly 73 feels a force pulling it towards the base/mounting platform 9. At a certain point as the tension force increases, the torsional spring 13 preload forces in a certain segment of the linkage chain are overcome. This causes that segment to move toward a retracted configuration. As the drive motor 32 continues to turn, each segment is moved to a retracted configuration until the entire apparatus is in the retracted configuration. In certain applications, it may be desirable to have the segments retract in a predetermined sequence. To accomplish this, the linkage preload springs 13 may be customized for each linkage assembly 8 set, putting weaker springs on those sets that are desired to retract first and stronger springs on those sets that are desired to retract last.

If it is desired to extend the apparatus, the drive motor 32 is made to turn clockwise as shown in FIG. 8. This causes a tension increase in the section of the flexible element 25 between the drive motor pulley 33 and the web connection point nearest point 30 shown in FIG. 7B. This section of the flexible element 25 under increased tension winds through all linkage attachment frames 45 and 46 except the last 47. The increase in tension between routing pulleys 29 and 28 on the linkage attachment frame 46 is reacted by internal stresses within the frame 46. The increase in web tension along a second variable length portion $25_2$ of the flexible element 25 between linkage attachment frames 45, 46 and 47 results in a force pulling the lower pulley 28 of one linkage attachment frame 46 or 47 toward the higher pulley 29 of the adjacent linkage attachment frame 45 or 46 that is more nearly connected to the base/mounting platform 9. This force is initially resisted by the torsional spring 13 preload force in the linkage assemblies 8. At a certain point, as the tension force increases, the spring 13 preload force in a certain set of linkage assemblies 8 is overcome. This causes this linkage chain segment to move to an extended configuration. As the drive motor 32 continues to turn, each segment moves to an extended configuration until the entire apparatus is in the extended configuration.

A beneficial feature of the extension-retraction system 10 as described above is that the routing length of the flexible element 25 remains nominally the same regardless of the configuration of the apparatus. This avoids the need for a take-up and storage system.

The location shown in FIGS. 6A through 6J for the extension-retraction motor 32, drive pulley 33, tensioning pulleys 35, and related mounting hardware is one of many possible locations. The requirement for location the drive system is that the drive pulley 33 be located between pulley 29 of linkage attachment frame 45 and attachment point near point 31 on linkage attachment frame 47 when it is in the retracted position.

In the discussion above concerning the fifth embodiment, the motor could be replaced with a rotational spring. This embodiment was classified above as the sixth embodiment.

In the discussion above concerning the fifth embodiment, the motor could be replaced with a rotational brake. This embodiment was classified above as the seventh embodiment.

In the discussions above involving a flexible element 25, a frictional brake could be added that would directly grip the flexible element 25. This embodiment was classified above as the eighth embodiment.

If several apparatuses are used in conjunction with each other, as will be described below, each apparatus may have its own extension-retraction system 10. It is also possible for one apparatus to drive the other apparatuses by one or more common connections. Any redundant extension-retraction system 10 could provide a safety backup.

Variations of the current invention can be created that combine elements discussed above to meet the needs of a specific application. FIGS. 11A through 11G, 12, 13, 14, and 15 show an apparatus or portions of an apparatus that has double the amount of linkage assemblies 58 (i.e., linkage units) compared to the preceding versions, even though the number of linkage chain segments is the same. To accommodate this addition, additional attachment points 23 and 24 are added to the linkage attachment frame 55, 56, and 57 (e.g., linkage interconnect member). This variation will benefit applications that have high external side loads and moments by providing added stability to and across the linkage attachment frames 55, 56, and 57 (e.g., linkage interconnect members). Certain forms of this variation may require the addition of feature 52 on the linkage assembly 58 to allow the stacking of a second end of a first linkage assembly 58 with the first end of a second linkage assembly 58. A spacer 54 can be used on the upper pair of last linkage assemblies 58 since no linkage assemblies 58 are required forward of this position. The previous function of each individual component remains the same as the prior variations, even though some quantities have increased. Discussions above that considered order dependency for the linkage attachment frames 6a, 6b, and 6c also hold for their current versions 56a, 56b, and 56c respectively. Discussions above that considered the position of linkage assemblies 8a and 8b also hold for their current versions 58a and 58b.

FIGS. 16A through 16D, 17, and 18 show an apparatus or portions of an apparatus that adds connection links 59 to the variation in the preceding paragraph. The connection links 59 connect the linkage assemblies 58 added in the preceding paragraph to the first linkage assemblies 58. This connection is made across a new feature 53 on the linkage assemblies 58 as illustrated in FIG. 13. This variation will benefit applications that have high forward or backward loads and moments, by forming two four-bar linkages out of the two linkage assemblies 58 (FBL, FBL').

Additional variations of the apparatus may be formed by further combining and adding features as described in the preceding two paragraphs without departing from the spirit of this invention.

The preceding three paragraphs dealt with combining and adding features within a single combined linkage assembly 73 to create new variations of the current invention. Below, variations of the current invention will be described that use multiple combined linkage assemblies 73 in conjunction with each other.

FIGS. 19A and 19B show an exemplary form of the current invention which integrates four combined linkage assemblies 73 to form an apparatus. Likewise FIGS. 20A and 20B show a form which integrates three combined linkage assemblies 73. The combined linkage assembly 73, illustrated in FIGS. 21A through 21D has different requirements and is modified from those discussed above. Each corresponding linkage attachment frame 65, 66, and 67 of all the combined linkage assemblies 73 used in the apparatus is coordinated in movement by a fixed connection to others of the same linkage chain segment position. Forms of the invention sharing these characteristics have been classified above as the eleventh embodiment and are further described below.

The linkage attachment frames 5, 6, 7, 45, 46, 47, 55, 56, and 57 of previous embodiments all had sets of revolving joint axes that were not parallel with each other as described above. The linkage attachment frames of the current embodiment 65, 66, and 67 may also have similar sets of non-parallel joint axes. However, their connection with the other corresponding linkage attachment frames 65, 66, and 67 also permits them to discard the non-parallel joint axes as illustrated in FIG. 23. The function provided by the non-parallel joint axes, as described above, is fulfilled by the joint axes of a connected linkage attachment frame 65, 66, and 67 whose joint axes are non-parallel with the first. This allows as few as two combined linkage assemblies 73 to form the current embodiment of the current invention.

Even though eliminating the non-parallel joint axes from the combined linkage assembly 73 represents a significant difference from those discussed previously, the function and operation is quite similar. In particular, FIGS. 3, 11G, 16D, and 21D all show a similar view, normal to the illustrated joint axes, of the apparatus in various embodiments and with different optional components. The essential functions, provided by the most basic embodiment illustrated in FIG. 3 and described above, are present in the others as well. The current embodiment, illustrated in FIG. 21D substitutes linkage assembly 68 for earlier linkage assemblies 8 and 58. Linkage assembly 68 (i.e., linkage unit) adds additional link arms 15 and 19, however the function of the linkage assembly 68 is similar to the earlier versions. Likewise, the relationship between the open (e.g., unfolded) linkage assembly 68a and 68b within an extended or retracted segment is similar to the relationship of open (e.g., unfolded) linkage assemblies 8a, 58a, 8b, and 58b discussed above. The linkage attachment frames 65, 66a, 66b, 66c, and 67 as shown in FIG. 21D are similar to their respective linkage attachment frames 5, 45, 55, 6a, 46a, 56a, 6b, 46b, 56b, 6c, 46c, 56c, 7, 47, and 57 in basic function and in optional functions such as extension-retraction. The connection link 69 is similar in function to connection link 59 discussed earlier. Its shape is different, where needed, to avoid interference with other components of the apparatus.

A significant benefit is gained when placing combined linkage assemblies 73 opposite from one another as shown in FIGS. 19A and 19B. Significant internal loads are generated when the apparatus supports a load in the direction of movement. The internal loads not in the direction of movement can be balanced against the corresponding opposing load from the opposite combined linkage assembly 73. The loads are transferred from one linkage attachment frame 65, 66, and 67 to the corresponding opposite frame 65, 66, and 67 by either a connecting framework 44a, 44b, or 44c; a platform 42; or a base/mounting platform 9.

If an odd number, three or higher, of combined linkage assemblies 73 are used in the apparatus, as illustrated in FIGS. 20A and 20B, similar benefits as mentioned in the preceding paragraph can be enjoyed. In this case, the internal loads not in the direction of movement are balanced among the combined linkage assemblies 73. Likewise, the loads are transferred among the linkage attachment frames 65, 66, and 67 by either a connecting framework 43a, 43b, or 43c; a platform 42, or a base/mounting platform 9.

To secure the linkage attachment frames 66 and 67 to their respective frameworks 43 and 44 or platform 42, an attachment point 71 is added as shown at the top of FIG. 23. Linkage attachment frames 65 are secured at the bottom to the base/mounting platform 9. Alternatively, multiple attachment points and multiple frameworks could be used to connect linkage attachment frames to each other. For example, an attachment point 71 could also be added to the top of linkage attachment frame 65. The attachment points 71 of the frames 65 could be joined together by a framework thereby providing multiple attachment points. In addition, the function of the linkage attachment frame could be integrated with the objects which the apparatus is supporting and actuating. An example of this integration is found in U.S. Utility patent application—Ser. No. 11/425,854, filed Jun. 22, 2006, now U.S. Pat. No. 7,380,868. As mentioned above, this application is hereby incorporated by reference in its entirety.

The above example integration mounts a collapsible aerodynamic device on the rear of an over-the-road trailer. Referring now to the figures, in particular to FIGS. 25A through 25D, there is shown an exemplary over-the-road trailer 1 with an enclosed cargo holding area 1a. On the back end of the trailer 1, a left hand apparatus 2 and a right hand apparatus 3 are mounted and shown in various configurations. FIGS. 26A through 26C show the right hand apparatus in detail in various configurations including a rear door/mounting platform 9 of the trailer 1 which, in this embodiment, serves as a mounting platform for the right hand apparatus 3 and is also part of the apparatus 3. In this example, the left hand apparatus 2 is a mirror image of the right hand apparatus 3. For gaining access to the cargo holding area 1a of the trailer 1, the apparatuses 2 and 3 are opened as typical trailer doors.

FIGS. 26A through 26C reveal other features of a typical apparatus 2 or 3 in addition to the door/mounting platform 9. In this section of the disclosure, the placement position of the features and components is described with respect to a fully deployed apparatus as shown in FIG. 26C. Immediately behind and fixedly connected to the door/mounting platform 9 are an optional extension-retraction system 10 and the first panel assembly/linkage attachment frame 5. A plurality of intermediate panel assemblies/linkage attachment frames 6, each having a different size but sharing the same features, follows the first panel assembly/linkage attachment frame 5. The last panel assembly/linkage attachment frame 7 immediately follows the last intermediate panel assembly/linkage attachment frame 6. Connecting the various panel assemblies/linkage attachment frames 5, 6, and 7 to each other are sets of extension-retraction linkage assemblies 4 or 8. Linkage assemblies 4 and 8 perform the same function, but linkage assembly 8 is narrower in the direction of its pivot axis and is used between the rearward panel assemblies 6 and 7 where there is less available space.

A set of extension-retraction linkage assemblies 4 or 8 holds each intermediate panel assembly/linkage attachment frame 6 to the panel assembly/linkage attachment frame 5 or 6 immediately in front of it. A second set of linkage assemblies 4 or 8 holds each intermediate panel assembly/linkage attachment frame 6 to the panel assembly/linkage attachment frame 6 or 7 immediately to its rear. In this way, all panel assemblies 5, 6, and 7 are held to each other in series with a set of linkage assemblies 4 or 8 between each. The linkage assemblies 4 or 8 in each set allow linear movement between each panel assembly/linkage attachment frame 5, 6, or 7 and its neighbor(s). To accomplish the linear movement, at least two linkage assemblies 4 or 8 are required in each set. Each linkage assembly 4 or 8 by itself constrains the panel assembly/linkage attachment frame 6 or 7 connected to its rear to move in a plane perpendicular to its joint axes of rotation. If two linkage assemblies 4 or 8 have corresponding axes that are collinear, the panel assembly/linkage attachment frame 6 or 7 is still constrained to move in a perpendicular plane. However, if the corresponding axes are coplanar, but not collinear, a second planar constraint is formed. In this case, the two planar constraints combine to form a linear constraint at their common intersection. Additional linkage assemblies 4 or 8 may be used to distribute the loads transferred between panel assemblies/linkage attachment frame 5, 6, or 7 among more connection locations.

Referring to FIGS. 2A through 2I and 27A through 27C, example extension-retraction linkage assemblies 4 and 8 and their components and features are shown. The linkage assemblies 4 and 8 consists of two links 11 and 12 that rotatably connect to each other with the rotational surface 16 of link 11 forming a joint with the rotational surface 18 of link 12. This joint is constrained such that it effectively rotates about the common centerlines of the above surfaces. In this example, provisions are made that effectively restrict any linear movement along the common centerlines. A torsional spring 13 is also included along the above joint that tends to cause the cylindrical surfaces 14 and 20 at the ends of the linkage assemblies 4 and 8 to extend away from each other. To keep the linkage assemblies 4 and 8 from overextending, a stop 17 is provided on link 11 that contacts a surface 21 on link 12. Unless an external force is acting on the linkage assemblies 4 or 8, the spring 13 keeps the stop 17 and stop surface 21 in contact with each other with a certain amount of preload. The various features of link 11 are held in place by one or more link arms 15. The various features of link 12 are held together by one or more link arms 19. In this example, when assembled, the centerlines of the cylindrical surfaces 14, 16, 18, and 20 are all parallel with each other.

The extension-retraction linkage assemblies 4 and 8 also connects to the various panel assemblies/linkage attachment frames 5, 6, and 7 as mentioned above and described below. Panel assemblies/linkage attachment frames 5 and 6 have interior rotational surfaces 23 and 24 that rotatably connect to rotational surface 14 of link 11. Likewise, panel assemblies/linkage attachment frames 6 and 7 have rotational surfaces 26 and 27 towards their upstream edge that rotatably connect to rotational surface 20 of link 12. As shown in FIGS. 28A through 28D, the centerlines of surfaces 23 and 24 are coplanar, but not collinear. Likewise, as shown in FIGS. 28A through 28D, the centerlines A of 26 and 27 are coplanar, but not collinear. This geometry satisfies the above requirement to produce linear movement between adjacent panel assemblies/linkage attachment frames 5, 6, and 7 when used with two or more linkage assemblies 4 or 8 as described above.

The panel assemblies/linkage attachment frames 5, 6, and 7 are each constructed from a set of panels/framework 22 that also locate the various features described above. Notches 129 are cut into the upstream edge of the panels/framework 22 as required to provide clearance with the linkage assemblies 4 and 8 as they travel through their range of motion.

There are other benefits provided by the linkage assemblies 4 or 8 and panel assemblies/linkage attachment frames 5, 6, and 7 when used together as described above. One is the travel-stop function that keeps the panel assemblies/linkage attachment frames 5, 6, and 7 from over retracting and over extending. FIG. 30 illustrates this by showing two linkage assemblies 4 extended against their respective stops 17. The pair of panel assemblies/linkage attachment frames 6 shown higher in the figure is fully extended and is prevented from extending farther by the stop 17 on the linkage assembly 4. Likewise, the lower pair of panel assemblies/linkage attachment frames 6 are fully retracted and prevented from retracting farther by the stop 17. A second benefit is the self-return function. When each linkage assembly 4 or 8 is spring loaded against its stop 17, each pair of panel assemblies/linkage attachment frames 5, 6, and 7 connected to them has only two stable positions—fully extended and fully retracted. If the pair of panel assemblies/linkage attachment frames 5, 6, and 7 are put in another configuration and released, the spring 13 will return the pair to one of the two stable positions. This feature allows the apparatuses 2 and 3 to be set in an extended or retracted configuration and keep this position until the opposite configuration is desired.

If desired, an optional feature can be incorporated on the apparatuses 2 and 3 that allows for remote, powered extension and retraction. FIGS. 29A and 29B illustrate this extension-retraction system 10 as applied to the current embodiment. FIGS. 32E and 32F also illustrate this extension-retraction system as applied to a similar embodiment. The larger scale of FIG. 32F shows the routing of the extension-retraction web 25 most clearly. FIG. 32F shows typical panel assembly/linkage attachment frame 6 and 86 cross-sections and highlights the web routing features 125 and 128. To operate the extension-retraction system 10, a drive motor 32 rotates a connected drive pulley 33, which moves a web/belt 25 in one direction when turning clockwise and the opposite direction when turning counter-clockwise. As shown, the web/belt 25 is kept under tension by a pair of tensioning pulleys 35 which also serve to keep most of the drive pulley 33 in contact with the web/belt 25. A corner idler pulley 34 is also employed near the joint between the first panel assembly/linkage attachment frame 5 and the trailer door/mounting platform 9. The web/belt 25 is attached on each end to the last panel assembly/ linkage attachment frame 7. One end is attached at a downstream connection point 31, and the opposite end is attached at an upstream connection point 30.

The operation of the extension-retraction system 10 is described below. If retraction is desired, the drive motor 32 is made to turn counter-clockwise as shown in FIG. 29A. This causes a tension increase in the section of the web/belt 25 between the drive motor pulley 33 and web/belt connection point 31. The increase in tension pulls the last panel assembly/linkage attachment frame 7 towards the first panel assembly/linkage attachment frame 5. Since the panel assemblies/linkage attachment frames 5, 6, and 7 and linkage assemblies 4 and 8 are connected in series; the entire linkage-panel/framework chain feels a force pulling it towards the first panel assembly/linkage attachment frame 5. At a certain point as the tension force increases, the spring 13 preload forces in a certain set of linkage assemblies 4 or 8 are overcome. This causes the pair of panel assemblies/linkage attachment frame 5, 6, or 7 on either side of the overcome set of linkage assemblies 4 or 8 to switch to a retracted configuration. As the drive motor 32 continues to turn, the panel assemblies/linkage attachment frames 5, 6, and 7 each switch to a retracted configuration until the entire apparatus 2 or 3 is in the retracted configuration. With certain options described below, it may be desirable to have the panels/frameworks retract in a predetermined sequence. To accomplish this, the linkage preload springs 13 may be customized for each linkage assembly 4 or 8 set putting weaker springs on those sets that are desired to retract first and stronger springs on those sets that are desired to retract last.

If it is desired to extend the apparatus 2 and 3, the drive motor 32 is made to turn clockwise as shown in FIG. 29A. This causes a tension increase in the section of web/belt 25 between the drive motor pulley 33 and the web/belt connection point 30. The increase in web/belt 25 tension between web routing features 125 and 128 on the same panel assembly/linkage attachment frame 6 is reacted by internal stresses within the panel assembly/linkage attachment frame 6. The increase in web/belt 25 tension between panel assemblies/linkage attachment frames 5, 6 and 7 results in a force pulling the upstream edge of the downstream panel assembly/linkage attachment frame 6 or 7 toward the downstream edge of the upstream panel assembly/linkage attachment frame 5 or 6. This force is initially resisted by the spring 13 preload force in the linkage assemblies 4 and 8. At a certain point as the tension force increases, the spring 13 preload force in a certain set of linkage assemblies 4 or 8 is overcome. This causes the pair of panel assemblies/linkage attachment frames 5, 6, or 7 on either side of the overcome set of linkage assemblies 4 or 8 to switch to an extended configuration. As the drive motor 32 continues to turn, the panel assemblies/linkage attachment frames 5, 6, and 7 each switch to an extended configuration until the entire apparatus 2 or 3 is in the extended configuration.

A benefit of the extension-retraction system 10 as described above is that the routing length of the web/belt 25 remains nominally the same regardless of the configuration of the panel assemblies/linkage attachment frames 5, 6, and/or 7. This avoids the need for a web/belt 25 take up and storage system.

If a larger radius on the web/belt guiding features 125 and 128 within the panel assemblies/linkage attachment frames 5 and 6 is required, either the panel assembly/framework can be made thicker or the features 125 and 128 could be made to protrude outside the existing panel assembly/linkage attachment frame 5 and 6 boundary. The protrusion could either be covered or left open to the environment. This will likely cause a small increase in drag, but may render the present invention more robust.

A space is reserved for the extension-retraction motor 32, drive pulley 33, tensioning pulleys 35, and related mounting hardware by making the last panel assembly/linkage attachment frame 7 shorter in depth than the other panel assemblies/linkage attachment frames 5 and 6. When retracted, the last panel assembly/linkage attachment frame 7 is positioned to the rear of the drive motor 32, but remains within the overall contours of the retracted apparatus 2 and 3. In the case that the extension-retraction system 10 is not used, or in the case that the form of the current embodiment provides a space for the motor 32 and its related items to occupy, the panel assemblies/linkage attachment frames 5, 6, and 7 should be the same depth to minimize the volume required in the retracted configuration.

A modification to the above version of the eleventh embodiment is shown in FIGS. 32A through 32F that provides for a smooth transition from the exterior surfaces of the over-the-road trailer 1 to apparatuses 82 and 83. This form of the apparatuses 82 and 83 has all the same components and features as the above apparatuses 2 and 3 except for those specifically mentioned in the conversion process below. Apparatuses 82 and 83 will further reduce drag, but will cost more to produce. To convert apparatuses 2 and 3 into apparatuses 82 and 83, several steps are required. To begin, the first panel assembly/linkage attachment frame 5 is replaced by the first panel assembly/linkage attachment frame 85. Next, the panel assembly/linkage attachment frame 6 adjacent to the first panel assembly/linkage attachment frame 85 is replaced by panel assembly/linkage attachment frame 86. Finally, the first set of linkage assemblies 4 are replaced by a set of linkage assemblies 84 (i.e., linkage units), and the extension-retraction corner pulley 34 is moved slightly. The first panel assembly/linkage attachment frame 85 has curved surfaces that blend the overall slope of the apparatuses 82 and 83 with the trailer 1. This creates a slightly smaller space for the extension-retraction linkage assembly 84 to occupy. This is addressed by using modified links in the linkage assembly 84, resulting in a lower profile. A torsional spring is used to spring load the linkage assembly 84 into the extended position. Panel assembly/linkage attachment frame 86 differs from panel assembly/linkage attachment frame 6 only by small notches that are required to allow the linkage assembly 84 to operate through its range of motion.

A modification to the eleventh embodiment is shown in FIGS. 33A through 33E that replaces the linkage assemblies 4 and 8 with straight links (or hinged panels) 133 and 134. The simplicity of the straight links 133 and 134 may result in a lower overall cost for this form of the invention compared to the above forms, exemplified by apparatuses 2 and 3. However, in certain versions, the reduced cost sacrifices the robust travel-stop function as described above. The door/mounting platform 131 is essentially the same as the door/mounting platform 9 described above. The panel assemblies/linkage attachment frames 132 and 135 replace panel assemblies 6 and 5 respectively. The panel assemblies/linkage attachment frame 132 and 135 have significantly smaller pivoting surfaces 23, 24, 26, and 27 in a slightly different location. The notches 129 are removed from panel assembly/linkage attachment frame 132, which is instead trimmed to a shorter depth than panel assembly/linkage attachment frame 135. This allows the straight links 134 to sit in a gap upstream from the upstream edge of the panel assemblies/linkage attachment frames 132 when the apparatus is in the fully retracted configuration.

In the present disclosure, the words "a" or "an" are to be taken to include both the singular and the plural. Conversely, any references to plural items shall, where appropriate, include the singular.

In the present disclosure, many features are described with respect to the theoretical design. For instance, "parallel" refers to the theoretical design goal. It is understood that imperfections exist and clearances are required in real parts. In these cases, such terms are used to distinguish the differences between theoretical designs.

In certain embodiments, the ratio of the extended height of the apparatus to the larger of its width or length is at least 1 to 1. In other embodiments, this ratio is at least 1.5 to 1, or at least 2 to 1, or at least 3 to 1.

In certain embodiments, the apparatus in accordance with the present disclosure may be automatically extended or retracted. A control system may be used to automatically control extension and retraction.

The apparatus in accordance with the present disclosure can have relatively high extended heights as compared to retracted heights. Certain embodiments have an extended height to retracted height ratio of at least 6 to 1. Other embodiments have extended height to retracted height ratios of at least 10 to 1 or at least 20 to 1.

While specific heights and dimensional ratios have been specified for certain embodiments of the present disclosure, it will be appreciated that the broad aspects of the present disclosure are not limited to these values.

From the foregoing it will be observed that numerous modifications and variations can be effectuated without departing from the true spirit and scope of the novel concepts of the present invention. It is to be understood that no limitation with respect to the specific embodiments illustrated is intended nor should be inferred.

What is claimed is:

1. A device comprising:
   a linkage arrangement that is movable between a retracted orientation and an extended orientation, the linkage arrangement including a first linkage unit and a second linkage unit, each of the linkage units including a first link pivotally connected to a second link by a linkage joint, the linkage arrangement also including an interconnect member that interconnects the first linkage unit to the second linkage unit, the interconnect member being pivotally connected to the first link of the first linkage unit and also being pivotally connected to the first link of the second linkage unit; the first and the second links of at least one of the first and the second linkage units being movable about its respective one of the linkage joints between folded and unfolded orientations, the first and the second links of the at least one of the first and the second linkage units being positioned in the unfolded orientation when the linkage arrangement is in the extended orientation and also being positioned in the unfolded orientation when the linkage arrangement is in the retracted orientation, and the first and the second links of the at least one of the first and the second linkage units moving from the unfolded orientation to the folded orientation and then from the folded orientation back to the unfolded orientation as the linkage arrangement is moved from the retracted orientation to the extended orientation.

2. The device of claim 1, wherein the interconnect member moves along a substantially linear path as the linkage arrangement is moved from the retracted orientation to the extended orientation.

3. The device of claim 1, wherein the at least one of the first and the second linkage units includes a positive stop for preventing the first and the second links from pivoting beyond the unfolded orientation.

4. The device of claim 1, wherein the at least one of the first and the second linkage units includes a spring for biasing the first and the second links toward the unfolded orientation.

5. The device of claim 1, further including a drive mechanism for moving the linkage arrangement from the retracted orientation to the extended orientation.

6. The device of claim 5, wherein the drive mechanism includes a motor.

7. The device of claim 1, further comprising a tension member arrangement adapted to extend the linkage arrangement toward the extended orientation and also adapted to retract the linkage arrangement toward the retracted orientation.

8. The device of claim 7, wherein the tension member arrangement includes a single tension member.

9. The device of claim 1, further comprising a second interconnect member that also interconnects the first linkage unit to the second linkage unit, the second interconnect member being pivotally connected to the second link of the first linkage unit and also being pivotally connected to the second link of the second linkage unit, wherein the interconnect member is a first interconnect member.

10. The device of claim 9, wherein the first interconnect member includes at least one external attachment point and the second interconnect member includes a base.

11. The device of claim 9, further comprising a third interconnect member, a third linkage unit, and a fourth linkage unit, wherein the second interconnect member is pivotally connected to the first link of the third linkage unit and also is pivotally connected to the first link of the fourth linkage unit, and wherein the third interconnect member is pivotally connected to the second link of the third linkage unit and also is pivotally connected to the second link of the fourth linkage unit.

12. The device of claim 1, wherein at least one of the first and the second linkage units includes a first four-bar linkage and a second four-bar linkage, the first four-bar linkage including the first link and the second four-bar linkage including the second link.

13. The device of claim 1, wherein the unfolded orientation of the first and the second links of the first and the second linkage units is a fully unfolded orientation when the linkage arrangement is at the extended orientation.

14. The device of claim 1, wherein the unfolded orientation of the first and the second links of the first and the second linkage units is a fully unfolded orientation when the linkage arrangement is at the retracted orientation.

15. The device of claim 14, wherein the unfolded orientation of the first and the second links of the first and the second linkage units is also the fully unfolded orientation when the linkage arrangement is at the extended orientation.

16. The device of claim 1, wherein at least one of the first and the second linkage units includes a four-bar linkage and the four-bar linkage includes at least one of the first link and the second link.

17. The device of claim 1, wherein at least one pivoting axis of the first linkage unit is non-parallel to at least one pivoting axis of the second linkage unit.

18. The device of claim 17, wherein the first and the second links of both of the first and the second linkage units are movable about their respective ones of the linkage joints between folded and unfolded orientations, the first and the second links of the first and the second linkage units each being positioned in the unfolded orientation when the linkage arrangement is in the extended orientation and also being positioned in the unfolded orientation when the linkage arrangement is in the retracted orientation, and the first and the second links of the first and the second linkage units each moving from the unfolded orientation to the folded orientation and then from the folded orientation back to the unfolded orientation as the linkage arrangement is moved from the retracted orientation to the extended orientation.

19. The device of claim 1, wherein the linkage arrangement is biased toward the retracted orientation when adjacent the retracted orientation and wherein the linkage arrangement is biased toward the extended orientation when adjacent the extended orientation.

20. The device of claim 1, wherein at least one of the linkage units includes a deformable portion.

21. A device comprising:
   a linkage arrangement that is movable between a first configuration and a second configuration, the linkage arrangement including a first linkage unit and a second linkage unit, the first linkage unit including a first link pivotally connected to a second link by a first linkage joint, the second linkage unit including a third link pivotally connected to a fourth link by a second linkage joint, pivoting axes of the first and the second linkage joints being non-parallel to each other, the linkage arrangement further including a first interconnect member that interconnects the first linkage unit to the second linkage unit, the first interconnect member being pivotally connected to the first link of the first linkage unit and also being pivotally connected to the third link of the second linkage unit, and the linkage arrangement further including a second interconnect member that interconnects the first linkage unit to the second linkage unit, the second interconnect member being pivotally connected to the second link of the first linkage unit and also being pivotally connected to the fourth link of the second linkage unit;
   a tension member arrangement routed between the first interconnect member and the second interconnect member; and
   a drive adapted to move the tension member arrangement in a first direction and a second direction, tension in a first segment of the tension member arrangement urging the linkage arrangement toward the first configuration when the linkage arrangement is between the first configuration and the second configuration and the tension member arrangement is moved in the first direction, and tension in a second segment of the tension member arrangement urging the linkage arrangement toward the second configuration when the linkage arrangement is between the first configuration and the second configuration and the tension member arrangement is moved in the second direction.

22. The device of claim 21, wherein the second interconnect member is mounted on a base of the linkage arrangement, wherein the base rotatably mounts at least one pulley about which the tension member arrangement is routed, and wherein the tension member arrangement is operably connected to the first interconnect member.

23. The device of claim 22, wherein the drive includes a motor mounted to the base, the first direction of the tension member arrangement corresponds to a first rotational direction of the motor, and the second direction of the tension member arrangement corresponds to a second rotational direction of the motor.

24. The device of claim 23, wherein the tension member arrangement includes a single tension member.

25. The device of claim 21, wherein at least one of the linkage units includes a deformable portion.

26. The device of claim 21, wherein the first segment and the second segment are each part of a same tension member that maintains a substantially constant route length as the tension member arrangement moves.

27. A device comprising:
   a base including a first linkage mount and a second linkage mount;
   a linkage arrangement including first and second linkage units, the first linkage unit including a first link with a first joint rotatably mounted to the first linkage mount of the base and the second linkage unit including a second link with a first joint rotatably mounted to the second linkage mount of the base, the first link including a second joint portion rotatably mounted to a first joint portion of a third link and the second link including a second joint portion rotatably mounted to a first joint portion of a fourth link, and pivoting axes of the joints of the first link being non-parallel with pivoting axes of the joints of the second link;
   a moveable member guided along a substantially linear path relative to the base by the linkage arrangement, the moveable member including a third linkage mount and a fourth linkage mount, a second joint of the third link rotatably mounted to the third linkage mount of the moveable member and a second joint of the fourth link rotatably mounted to the fourth linkage mount of the moveable member; and
   a tension member arrangement routed between the base and the moveable member, the tension member arrangement including a first variable length portion extending substantially parallel to the substantially linear path.

28. The device of claim 27, further comprising a drive adapted to move the tension member arrangement in a first direction and a second direction, the tension member arrangement moving the moveable member toward a first position and away from a second position of the moveable member when the moveable member is between the first position and the second position and the tension member is moved in the first direction, and the tension member arrangement moving the moveable member toward the second position and away from the first position of the moveable member when the moveable member is between the first position and the second position and the tension member is moved in the second direction.

29. The device of claim 27, wherein the first linkage unit further includes a fifth link with a first joint rotatably mounted to the first linkage mount of the base and the second linkage unit further includes a sixth link with a first joint rotatably mounted to the second linkage mount of the base, the fifth link including a second joint portion rotatably mounted to a first joint portion of a seventh link and the sixth link including a second joint portion rotatably mounted to a first joint portion of an eighth link, and a second joint of the seventh link rotatably mounted to the third linkage mount of the moveable member and a second joint of the eighth link rotatably mounted to the fourth linkage mount of the moveable member.

30. The device of claim 29, wherein the first linkage unit further includes a ninth link that forms a first four-bar linkage with the first and the fifth links and forms a second four-bar linkage with the third and the seventh links and wherein the second linkage unit further includes a tenth link that forms a third four-bar linkage with the second and the sixth links and forms a fourth four-bar linkage with the fourth and the eighth links.

31. The device of claim 27, wherein at least one of the linkage units includes a deformable portion.

32. The device of claim 27, wherein the linkage arrangement is a first linkage arrangement of a linkage chain of the linkage arrangements, wherein the devise further comprising a second linkage arrangement of the linkage chain of the linkage arrangements, and wherein the first and the second linkage arrangements are interconnected in the linkage chain of the linkage arrangements.

33. The device of claim 27, wherein the first linkage mount and the second linkage mount are fixed to the base.

34. The device of claim 27, wherein the tension member arrangement further includes a second variable length portion that also extends substantially parallel to the substantially linear path, wherein the moveable member moves toward a first position and away from a second position of the moveable member when the first variable length portion is shortened, and wherein the moveable member moves toward the second position and away from the first position of the moveable member when the second variable length portion is shortened.

35. The device of claim 34, wherein the first variable length portion and the second variable length portion are each part of a same tension member that maintains a substantially constant route length as the moveable member moves.

* * * * *